US007351958B2

(12) United States Patent
Vestal

(10) Patent No.: US 7,351,958 B2
(45) Date of Patent: Apr. 1, 2008

(54) ION OPTICS SYSTEMS

(75) Inventor: Marvin L. Vestal, Framingham, MA (US)

(73) Assignees: Applera Corporation, Framingham, MA (US); MDS Inc., Concord, Ontario (CA)

( * ) Notice: Subject to any disclaimer, the term of this patent is extended or adjusted under 35 U.S.C. 154(b) by 0 days.

(21) Appl. No.: 11/042,592

(22) Filed: Jan. 24, 2005

(65) Prior Publication Data

US 2006/0163469 A1 Jul. 27, 2006

(51) Int. Cl.
*B01D 59/44* (2006.01)

(52) U.S. Cl. .................................... 250/287; 250/297

(58) Field of Classification Search ................ 250/287, 250/297

See application file for complete search history.

(56) References Cited

U.S. PATENT DOCUMENTS 4,418,280 A 11/1983 Matsuda
5,126,565 A 6/1992 Rose
5,128,543 A 7/1992 Reed et al.
5,202,563 A 4/1993 Cotter et al.
5,449,914 A 9/1995 Rose et al.
5,464,985 A 11/1995 Cornish et al.
5,637,879 A 6/1997 Schueler
5,955,730 A 9/1999 Kerley et al.
6,013,913 A * 1/2000 Hanson ...................... 250/287
6,274,866 B1 8/2001 Li
6,365,892 B1 4/2002 Cotter et al.
6,469,295 B1 * 10/2002 Park ........................... 250/282
6,489,610 B1 12/2002 Barofsky et al.
6,580,070 B2 6/2003 Cornish et al.
6,770,878 B2 8/2004 Uhlemann et al.
6,781,121 B1 * 8/2004 Davis et al. ................ 250/287
6,867,414 B2 3/2005 Buttrill, Jr.
6,949,736 B2 * 9/2005 Ishihara ...................... 250/282

FOREIGN PATENT DOCUMENTS

DE 19633496 A1 2/1996

(Continued)

OTHER PUBLICATIONS

Hohl, et al. "Mass selective blanking in a compact multiple reflection time-of-flight mass spectrometer." *International Journal of Mass Spectrometry* 188 (1999):189-197.

(Continued)

*Primary Examiner*—David Vanore
(74) *Attorney, Agent, or Firm*—Choate Hall & Stewart LLP; Michael J. Bastian

(57) ABSTRACT

In various embodiments, provided are ion optics systems comprising an even number of ion mirrors arranged in pairs such that a trajectory of an ion exiting the ion optics system can be provided that intersects a surface substantially parallel to an image focal surface of the ion optics system at a position that is substantially independent of the kinetic energy the ion had on entering the ion optics system. In various embodiments, provided are ion optics systems comprising an even number of ion mirrors arranged in pairs where the first member and second member of each pair are disposed on opposite sides of a first plane such that the first member of the pair has a position that is substantially mirror-symmetric about the first plane relative to the position of the second member of the pair.

8 Claims, 23 Drawing Sheets

FOREIGN PATENT DOCUMENTS

| | | | |
|---|---|---|---|
| EP | 0427532 | A | 5/1991 |
| GB | 2080021 | | 1/1982 |
| GB | 2339958 | | 2/2000 |
| WO | 1987/07762 | | 12/1987 |
| WO | 2001/69648 | | 9/2001 |

OTHER PUBLICATIONS

Kim, et al. "High-resolution ion time-of-flight analysis for measuring molecular velocity distributions." Review of Scientific Instruments, vol. 74, No. 11 (2003):4805-4811.

Matsuda, H., et al. "Potential Distribution in a Cylindrical Condenser Terminated by Matsuda Plates." *International Journal of Mass Spectrometry and Ion Physics*, 19 (1975):395-404.

Matsuda, Hisashi "Electrostatic Analyzer with Variable Focal Length." *The Review of Scientific Instruments*, vol. 32, No. 7 (1961):850-852.

Poschenrieder, W.P. "Multiple-Focusing Time-of-Flight Mass Spectrometers Part II TOFMS with Equal Energy Acceleration." *International Journal of Mass Spectrometry and Ion Physics*, 9 (1972):357-373.

Sakurai, T., et al. "A New Time-of-Flight Mass Spectrometer." *International Journal of Mass Spectrometry and Ion Processes*, 66 (1985):283-290.

Sakurai, Toru, et al. "MS/MS and MS/MS/MS Analyses in a Multisector Time-of-Flight Mass Spectrometer." *Analytical Chemistry*, vol. 66, No. 14, (1994):2313-2317.

Wollnik, Hermann, "Ion Optics in Mass Spectrometers." *Journal of Mass Spectrometry*, 34:991-1006 (1999).

"International Search Report", PCT/US2006/002338, Jun. 8, 2007.

Wollnick, H., et al. International Journal of Mass Spectrometry and Ion Processes, Elsevier Scientific Publishing Company, Amsterdam, NL, vol. 96, No. 3, Apr. 1990, pp. 267-274.

"Written Opinion of the International Searching Authority," PCT/US2006/002338, Jun. 8, 2007.

"Non-Final Rejection," U.S. Appl. No. 11/042,191, Sep. 6, 2006.

"Non-Final Rejection," U.S. Appl. No. 11/042,191, Feb. 26, 2007.

"Amendment in Response to Non-Final Office Action, " Doc. No. 4,215,24v2, U.S. Appl. No. 11/042,191, Jun. 26, 2007.

"International Search Report," EPO, PCT/US2006/002596, Apr. 17, 2007.

"Written Opinion of the International Searching Authority," PCT/US2006/002596, Apr. 17, 2007.

* cited by examiner

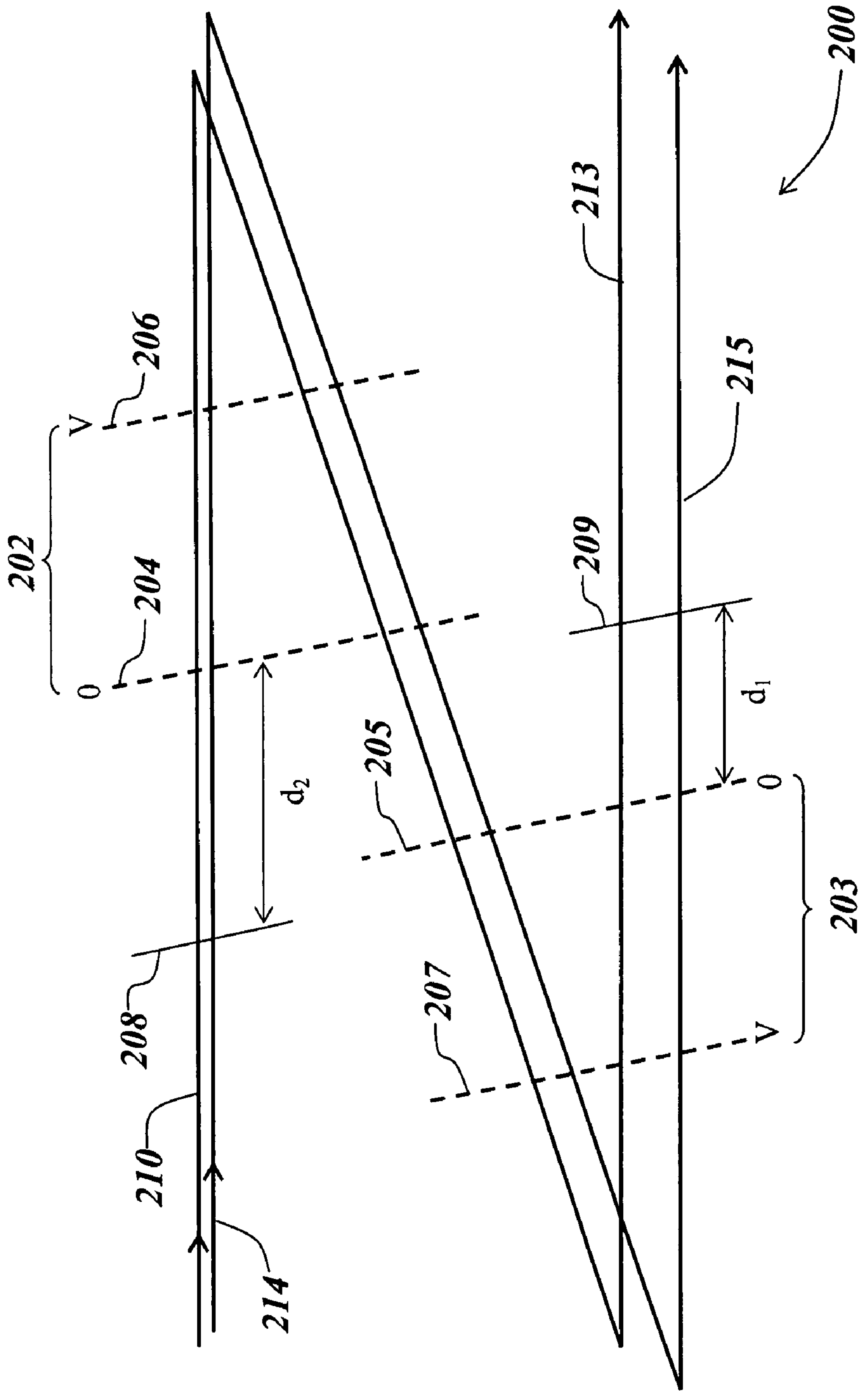
FIGURE 2 *(vertically flipped)*

ION OPTICS SYSTEMS

INTRODUCTION

Time-of-flight (TOF) mass spectrometry (MS) has become a widely used analytical technique. Two important metrics of mass spectrometry instrumentation performance are resolving power and sensitivity. In mass spectrometry, the mass resolving power of a measurement is related to the ability to separate ions of differing mass-to-charge ratio (m/z) values. The sensitivity of a mass spectrometry instrument is related to the efficiency of ion transmission from source to detector, and the efficiency of ion detection. In various mass spectrometers, including TOF instruments, it is possible to improve the resolving power at the expense of sensitivity, and vice versa.

There are several aspects of TOF MS that can inherently limit the resolution of a TOF mass analyzer. Specifically, ions can be formed in the source region at different times, at different positions, and with different initial velocities. These spreads in ion formation time, position and velocity can result in some ions with the same m/z achieving different kinetic energies (and some ions with different m/z achieving the same kinetic energy) due to differences in the length of time they spend in the extracting electrical field, differences in the strength of the electrical field where they are formed, and/or different initial kinetic energies. As a result, the resolving power and performance of the TOF mass spectrometer instrument can be degraded.

The mass resolving power of a mass spectrometer may be expressed as a ratio m/δm, where m is the mass of a particular singly charged ion and /δm is the width of the peak in mass units. In traditional TOF instruments, ions are separated according to their flight time, t, to a detector, and in most cases the mass/charge ratio is proportional to the square of the flight time. Thus, the resolving power, R, can be expressed as, $$R=m/\delta m,$$

and as $$R=t/2\delta t$$

in a TOF instrument.

In a simple linear TOF instrument comprising an ion source where the ions are formed and accelerated to a final energy that is substantially independent of the m/z ratio of the ions, the flight time is proportional to the effective flight distance, inversely proportional to the square root of the ion energy, and directly proportional to the square root of the mass/charge ratio. Any variation in the kinetic energy or effective flight distance for an ion of a particular m/z causes a variation in the flight time and corresponding reduction in resolving power.

In many cases a major factor limiting resolving power can be the spread in kinetic energy of the ions. In these cases an ion mirror is often employed to compensate for, to first or second order, the effect of kinetic energy on flight time, thereby improving the resolving power of the TOF instrument. One property of prior art ion mirrors, however, is that they produce energy dispersion whereby ions of differing kinetic energies may be time focused at a particular focal plane, but are displaced in a direction parallel to the plane according to their kinetic energies. In many applications this may not be a problem, but in others it can limit both the resolving power and the sensitivity of the mass analyzer. For example, in a single stage TOF instrument this energy dispersion can cause ions of different kinetic energies to strike different spots on the detector, but if the detector is sufficiently large, and the plane of the detector is accurately aligned with the focal plane, then no loss in either resolving power or sensitivity substantially occurs. However, applications where the ion mirror is used in the first stage of a TOF-TOF system, energy dispersion in the first stage can cause significant losses in both sensitivity and resolving power in the second stage of the instrument.

SUMMARY

The present teachings relate to ion optics systems for mass analyzer systems.

An ion mirror can be used to reflect ions from a first focal plane (an object plane) to a second focal plane (an image plane) such that ions at the first focal plane reach the second focal plane at substantially the same time despite differences in kinetic energy that existed between these ions at the first focal plane. Herein we refer to the process whereby an ion mirror can be used to bring ions with different kinetic energies to a particular plane in space at substantially the same time as "energy focusing." However, although ions can be made to arrive substantially simultaneously at an image plane despite differences in kinetic energy between them at the object plane, ions with differing kinetic energy do not arrive at the same spatial location on the image plane. Rather, the exit trajectories of ions with different kinetic energy intersect the image plane (or a plane substantially parallel to the image plane) at different spatial locations, which are typically laterally dispersed across such a plane. This process has been referred to as "energy dispersion" because, for example, it refers to a spatial dispersion of the ion trajectories that is due to differences in ion kinetic energy.

The skilled artisan will recognize that the concepts described herein using the terms energy dispersion, energy focusing, object plane and image plane can be described using different terms. As an ion mirror can be used to bring ions with different kinetic energies to a particular plane in space at substantially the same time, this process has been referred to by several terms in the art including, "energy focusing," "time focusing" and "temporal focusing." In addition, for example, the terms "space focus," "space focus plane," "space focal plane," "time focus," and "time focus plane" have all been used in the art to refer to one or more of what are referred to herein as the object plane and image plane. Unfortunately, the terms "energy focusing," "time focusing," "temporal focusing," "space focus," "space focus plane," "space focal plane," "time focus," and "time focus plane" have also been used in the art of time-of-flight mass spectrometry to describe processes that are fundamentally different from the energy focusing of an ion mirror. Accordingly, given the complex usage of terminology found in the mass spectrometry art, the terms "energy dispersion," "energy focusing,"0 "object plane" and "image plane" used herein were chosen for conciseness and consistency in explanation only and should not be construed out of the context of the present teachings to limit the subject matter described in any way.

The present teachings provide ion optics systems comprising two or more ion mirrors. In various embodiments, the present teachings provide ion optics systems that can provide energy focusing of ions with substantially no spatial dispersion due to differences in kinetic energy the ions may have had on entering the ion optics system. It is to be understood that differences in ion kinetic energy due to other processes that might arise after ions enter the ion optics system (e.g., including, but not limited to, space charge effects, ion fragmentation, etc.) are not considered by the present teachings to be differences in kinetic energy the ions have on entering the ion optics system. In various embodiments, the ion mirrors of an ion optics system according to the present teachings are arranged substantially mirror-symmetric about a plane.

A wide variety of arrangements of ion mirrors exists within the present teachings. For example, the ion mirrors can be arranged such that the ion trajectory exiting the ion optics system is substantially parallel, substantially anti-parallel, or at almost any angle in between, relative to the corresponding ion trajectory entering the ion optics system. The ion trajectory entering an ion optics system and the ion trajectory exiting the ion optics system can be on opposite sides of a symmetry plane.

In various embodiments, the ion mirrors can be arranged to provide a select lateral displacement, or substantially no lateral displacement between an incoming ion trajectory and the corresponding outgoing ion trajectory. For example, in various embodiments, the ion mirrors can be arranged such that the ion trajectory exiting an ion optics system is substantially coincident with the corresponding ion trajectory entering the ion optics system and either parallel or anti-parallel thereto.

In various aspects, the present teachings provide an ion optics system comprising an even number of ion mirrors arranged such that a trajectory of an ion exiting the ion optics system can be provided that intersects a surface substantially parallel to the image focal surface of the ion optics system at a position that is substantially independent of the kinetic energy the ion had on entering the ion optics system. In various embodiments, the ion mirrors are arranged in pairs where the first member and second member of each pair are disposed on opposite sides of a first plane such that the first member of the pair has a position that is substantially mirror-symmetric about the first plane relative to the position of the second member of the pair.

In various aspects, the present teachings provide an ion optics system comprising a first ion mirror and a second ion mirror, where the first ion mirror and second ion mirror are arranged such that a trajectory of an ion exiting the second ion mirror can be provided that intersects a surface substantially parallel to a focal surface of the second ion mirror at a position that is substantially independent of the kinetic energy the ion had on entering the first ion mirror. In various embodiments, the first ion mirror and the second ion mirror are disposed on opposite sides of a first plane such that the first ion mirror and the second ion mirror are arranged substantially mirror-symmetric about the first plane. Accordingly, in various embodiments, the electrical fields of the first ion mirror are substantially mirror-symmetric about the first plane with respect to the electrical fields of the second ion mirror.

In various aspects, the present teachings provide an ion optics system comprising two or more pairs of ion mirrors where the members of each pair of ion mirrors are disposed on opposite sides of a first plane such that the first member of a pair of ion mirrors has a position that is substantially mirror-symmetric about the first plane relative to the position of the second member of the pair. In various embodiments, the ion mirrors are arranged such that a trajectory of an ion exiting the ion optics system can be provided that intersects a surface substantially parallel to a focal surface of the ion optics system at a position that is substantially independent of the kinetic energy of the ion had on entering the ion optics system.

In various aspects, the present teachings provide an ion optics system comprising four ion mirrors where the first ion mirror and the second ion mirror disposed on opposite sides of a first plane such that the first ion mirror has a position that is substantially mirror-symmetric about the first plane relative to the position of the second ion mirror and where the third ion mirror and the fourth ion mirror are disposed on opposite sides of the first plane such that the third ion mirror has a position that is substantially mirror-symmetric about the first plane relative to the position of the fourth ion mirror. In various embodiments, the ion mirrors are arranged such that a trajectory of an ion exiting the fourth ion mirror can be provided that intersects a surface substantially parallel to a focal surface of the fourth ion mirror at a position that is substantially independent of the kinetic energy the ion had on entering the first ion mirror.

In various embodiments of an ion optics system of the present teachings, the ion optics systems comprises one or more of an ion source, ion selector, ion fragmentor, and ion detector. The ion optics systems can further comprise one or more ion guides (e.g., RF multipole guide, guide wire), ion-focusing elements (e.g., an einzel lens), and ion-steering elements (e.g., deflector plates). In various embodiments, an ion selector is positioned between two ion mirrors of an ion optics system to prevent the transmission of ions with select kinetic energies. Such placement can take advantage of the energy dispersion that can exist between at least two ion mirrors of the ion optics system. Suitable ion selectors include any structure that can prevent the transmission of ions based on ion position.

In various embodiments, an ion optics system of the present teachings comprises a first ion optics system and a second ion optics system. In various embodiments, the first ion optics system comprises an even number of ion mirrors arranged such that a trajectory of an ion exiting the first ion optics system can be provided that intersects a surface substantially parallel to the image focal surface of the first ion optics system at a position that is substantially independent of the ion kinetic energy; and the second ion optics system comprises an even number of ion mirrors arranged such that a trajectory of an ion exiting the second ion optics system can be provided that intersects a surface substantially parallel to the image focal surface of the second ion optics system at a position that is substantially independent of the ion kinetic energy. The ion mirrors of the first ion optics system, the second ion optics system, or both, can be arranged in pairs where the first member and second member of each pair are disposed on opposite sides of a first plane such that the first member of the pair has a position that is substantially mirror-symmetric about the first plane relative to the position of the second member of the pair.

In various embodiments, an ion fragmentor is disposed between the first ion optics system and the second ion optics system. The ion fragmentor is disposed, in some embodiments, such that the entrance to the ion fragmentor substantially coincides with the image surface (e.g., image plane) of the first ion optics system. In some embodiments, the ion fragmentor is disposed such that the exit of the ion fragmentor substantially coincides with a focal surface (e.g., an object focal surface) of the second ion optics system. In various embodiments, an ion selector can disposed between ion mirrors of the first ion optics system to prevent, for example, the transmission of ions with select kinetic energies between two ion mirrors of the first ion optics system, and thereby, select the range of ion kinetic energies transmitted by the first ion optics system. Accordingly, in various embodiments, the first ion optics system selects a primary ion, with a kinetic energy in a selected energy range, for introduction into an ion fragmentor and the second ion optics system is configured to transmit at least a portion of the fragment ions.

In various aspects, the present teachings provide mass analyzer systems comprising an ion optics system and one or more mass analyzers. The one or more mass analyzers comprising, for example, at least one of a time-of-flight, quadrupole, RF multipole, magnetic sector, electrostatic sector, ion trap, and an ion mobility spectrometer. The mass analyzer systems can further comprise one or more ion guides (e.g., RF multipole guide, guide wire), ion-focusing elements (e.g., an einzel lens), ion-steering elements (e.g., deflector plates), ion sources, ion selectors, ion fragmentors, and ion detectors. In various embodiments, the mass analyzer systems the present teachings can provide include, but are not limited to: a first time-of-flight (TOF) mass selector for a tandem TOF-TOF mass spectrometer system; and a TOF-TOF mass spectrometer system.

In various embodiments, the present teachings provide mass analyzer systems comprising a first ion optics system and a first mass analyzer. The first ion optics system comprising an even number of ion mirrors arranged such that a trajectory of an ion exiting the first ion optics system can be provided that intersects a surface substantially parallel to the image focal surface of the first ion optics system at a position that is substantially independent of the kinetic energy the ion had on entering the first ion optics system; and the first mass analyzer comprising at least one of a time-of-flight, quadrupole, RF multipole, magnetic sector, electrostatic sector, ion trap, and an ion mobility spectrometer. In various embodiments, the first ion optics system selects a primary ion for introduction into an ion fragmentor and a mass analyzer is configured to analyze at least a portion of the fragment ion spectrum.

In various embodiments, a mass analyzer system further comprises one or more ion selectors. In various embodiments, an ion selector is disposed between: an ion optics system and a mass analyzer, two ion mirrors of an ion optics system to prevent the transmission of ions with select kinetic energies, or both. For example, in various embodiments, an ion selector is disposed between a ion optics system and a mass analyzer such that the location of the ion selector substantially coincides with the image surface (e.g., image plane) of the first ion optics system. Suitable ion selectors include, e.g., timed-ion-selectors. In various embodiments, the trajectory of ions from the first ion optics system is substantially coaxial with an axis of the ion selector. In some embodiments, the ion selector is energized to transmit only ions within a selected m/z range to, for example, an ion fragmentor disposed between the ion selector and the mass analyzer. Accordingly, in various embodiments, an ion selector selects a primary ion (from the ions transmitted by the ion optics system) for introduction into an ion fragmentor and a mass analyzer is configured to analyze at least a portion of the fragment ions.

In various embodiments, an ion selector is positioned between two ion mirrors of the first ion optics system to prevent the transmission of ions with select kinetic energies. Such placement can take advantage of the energy dispersion that can exist between at least two ion mirrors of the ion optics system. Suitable ion selectors include any structure that can prevent the transmission of ions based on ion position.

Accordingly, in various embodiments, an ion optics system with an ion selector selects a primary ion, with a kinetic energy in a selected energy range, for introduction into an ion fragmentor and a mass analyzer is configured to analyze at least a portion of the fragment ions. In various embodiments, a first ion optics system with an ion selector selects a primary ion, with a kinetic energy in a selected energy range, for introduction into an ion fragmentor, a second ion optics system is configured select at least a portion of the fragment ions with a kinetic energy in a selected energy range for transmittal, and a mass analyzer is configured to analyze at least a portion of the selected fragment ions.

In various embodiments, the present teachings provide mass analyzer systems comprising a first mass analyzer, a first ion optics system, and a second mass analyzer, where the first ion optics system comprises an even number of ion mirrors arranged such that a trajectory of an ion exiting the first ion optics system can be provided that intersects a surface substantially parallel to the image focal surface of the first ion optics system at a position that is substantially independent of the kinetic energy the ion had on entering the first ion optics system. The first mass analyzer comprising, for example, at least one of a time-of-flight, quadrupole, RF multipole, magnetic sector, electrostatic sector, ion trap, and an ion mobility spectrometer; and the second mass analyzer comprising, e.g., at least one of a time-of-flight, quadrupole, RF multipole, magnetic sector, electrostatic sector, ion trap, and an ion mobility spectrometer. In various embodiments the first and second mass analyzers each comprise a time-of-flight (e.g., a substantially electrical field free region).

In various embodiments, an ion selector can be disposed between ion mirrors of an ion optics system of the present teachings to prevent, for example, the transmission of ions with select kinetic energies between two ion mirrors of the ion optics system, and thereby, select the range of ion kinetic energies transmitted by the ion optics system. Accordingly, in various embodiments, an ion optics system with an ion selector selects a primary ion, with a kinetic energy in a selected energy range, for introduction into an ion fragmentor and a mass analyzer is configured to analyze at least a portion of the fragment ions.

In various embodiments, an ion selector (e.g., a timed-ion selector) is disposed between the first ion optics system and the mass analyzer. The ion selector is disposed, in some embodiments, such that the location of the ion selector substantially coincides with the image surface (e.g., image plane) of the first ion optics system. In various embodiments, the trajectory of ions from the first ion optics system is substantially coaxial with an axis of the ion selector. In some embodiments, the ion selector is energized to transmit only ions within a selected m/z range. Accordingly, in various embodiments, an ion selector selects a primary ion (from the ions transmitted by the ion optics system) for introduction into an ion fragmentor and a mass analyzer is configured to analyze at least a portion of the fragment ions.

In various embodiments, a first ion selector can be disposed between ion mirrors of an ion optics system to select the range of ion kinetic energies transmitted by the ion optics system. Accordingly, in various embodiments, an ion optics system with an ion selector selects an ion, with a kinetic energy in a selected energy range, and a second ion selector (e.g. a timed-ion selector), disposed between the ion optics system and a mass analyzer, selects a primary ion for introduction into an ion fragmentor and the mass analyzer is configured to analyze at least a portion of the fragment ions.

In various embodiments, a mass analyzer system of the present teachings further comprises a second ion optics system. In various embodiments, the second ion optics system comprises an even number of ion mirrors arranged such that a trajectory of an ion exiting the second ion optics system can be provided that intersects a surface substantially parallel to the image focal surface of the second ion optics system at a position that is substantially independent of the kinetic energy the ion had on entering the second ion optics system. The ion mirrors of the first ion optics system, the second ion optics system, or both, can be arranged in pairs where the first member and second member of each pair are disposed on opposite sides of a first plane such that the first member of the pair has a position that is substantially mirror-symmetric about the first plane relative to the position of the second member of the pair.

In various embodiments, an ion selector is disposed between the first ion optics system and the second ion optics system. The ion selector is disposed, in some embodiments, such that the location of the ion selector substantially coincides with the image surface (e.g., image plane) of the first ion optics system, and the trajectory of ions from the first ion optics system is substantially coaxial with an axis of the ion selector. In some embodiments, the ion selector is energized to transmit only ions within a selected m/z range. Accordingly, in various embodiments, an ion selector selects a primary ion (from the ions transmitted by the first ion optics system) for introduction into an ion fragmentor, a second ion optics system is configured transmit at least a portion of the fragment ions to a mass analyzer which is configured to analyze at least a portion of the selected fragment ions.

As an ion selector can be disposed, in various embodiments, between ion mirrors of an ion optics system of the present teachings to prevent, for example, the transmission of ions with select kinetic energies, any one or more ion optics systems of a mass analyzer system can be, in various embodiments, configured to substantially transmit only ions in a select range of ion kinetic energies.

The foregoing and other aspects, embodiments, and features of the present teachings can be more fully understood from the following description in conjunction with the accompanying drawings. In the drawings like reference characters generally refer to like features and structural elements throughout the various figures. The drawings are not necessarily to scale, emphasis instead being placed upon illustrating the principles of the teachings.

BRIEF DESCRIPTION OF THE DRAWINGS

The skilled artisan will understand that the drawings, described herein, are for illustration purposes only. In the drawings the present teachings are illustrated using single-stage ion mirrors, but any ion mirror known in the art, including, but not limited to, gridded ion mirrors employing two or more stages with different fields applied at each stage, as well as gridless ion mirrors, can be used. The drawings are not intended to limit the scope of the present teachings in any way.

FIG. 2 schematically depicts two single-stage ion mirrors and representative ion trajectories of ions with two different kinetic energies.

FIGS. 13A-16B depict experimental data of Example 1, comparing MALDI-TOF mass spectra obtained using and not using an ion optics system according to the present teachings.

FIGS. 17A-20C depict experimental data of Example 2, comparing MALDI-TOF-TOF mass spectra obtained using an ion optics system according to the present teachings.

DESCRIPTION OF VARIOUS EMBODIMENTS

To better understand the present teachings, an example of the behavior of ions in a conventional single-stage ion mirror employing a uniform electrical field is provided; and an example of the behavior of ions in a conventional parallel arrangement of two ion mirrors employing uniform electrical fields is provided.

Single Ion Mirror

Figure 1A:
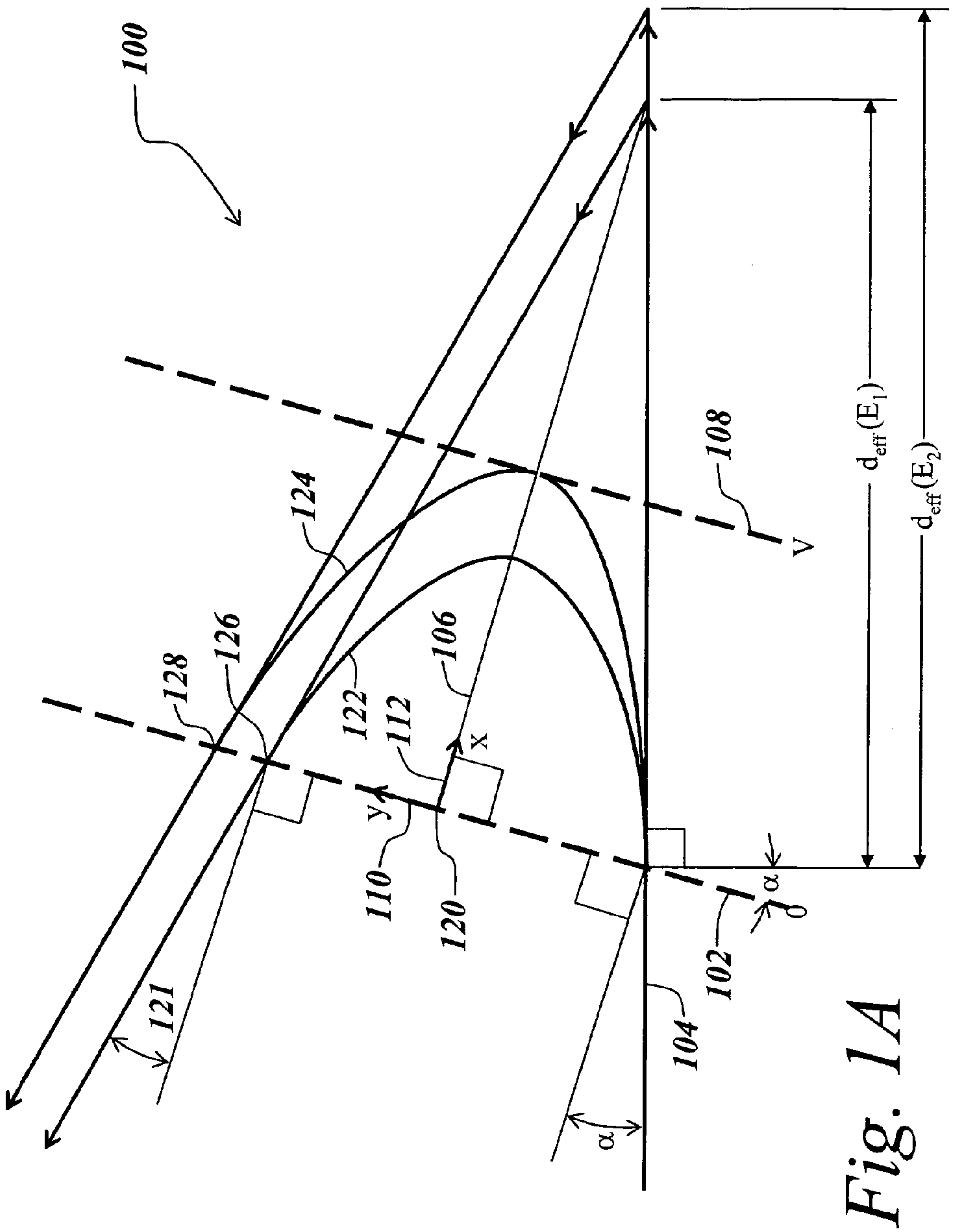
FIG. 1A schematically depicts a single-stage ion mirror and representative ion trajectories of ions with different kinetic energies.
Figure 1B:
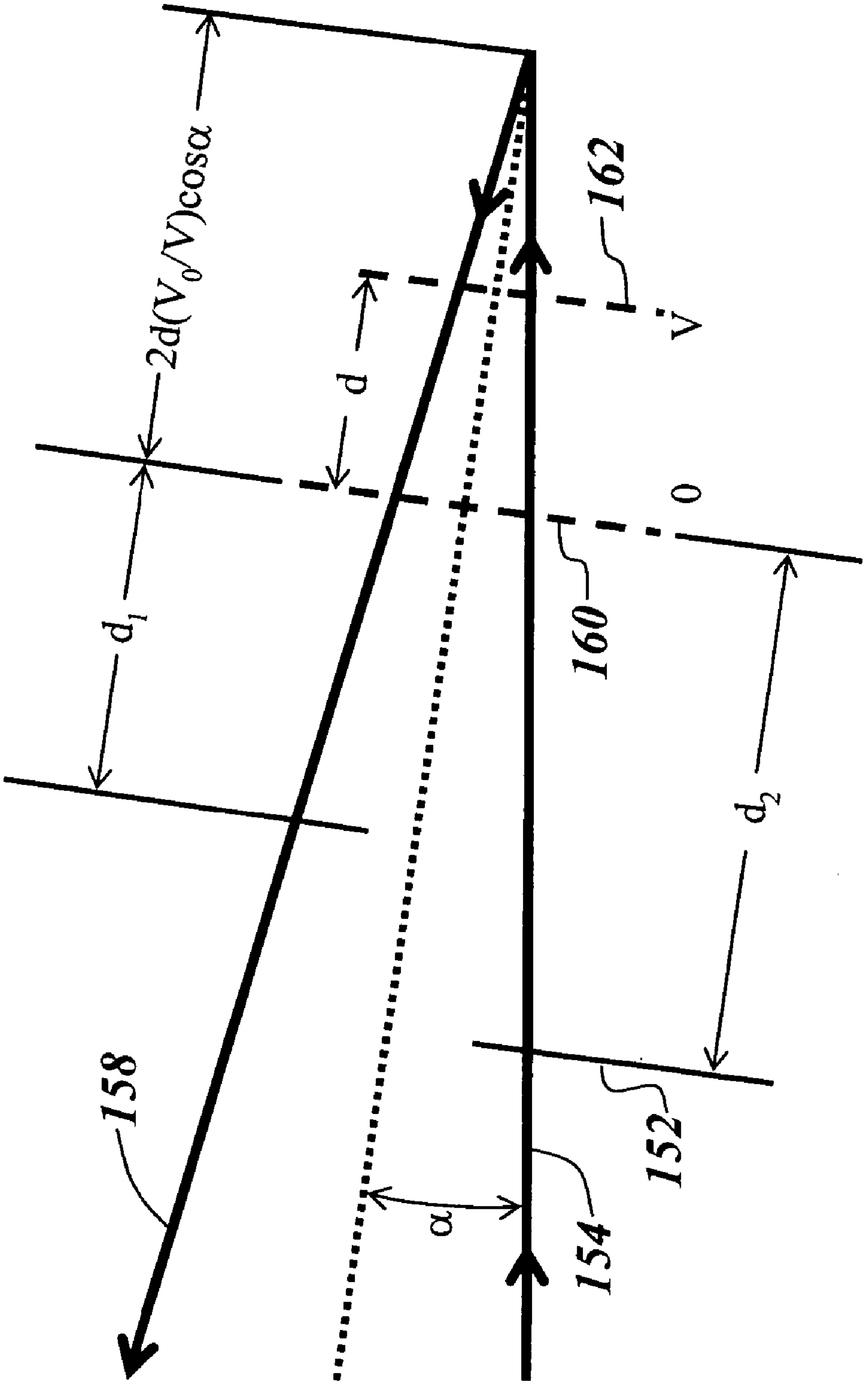
FIG. 1B schematically depicts an ion focusing of the single-stage ion mirror of FIG. 1A.

To better understand the present teachings, an example of the behavior of ions in a conventional single-stage ion mirror employing a uniform electrical field is schematically illustrated in FIG. 1A and an ion focusing of this single-stage ion mirror is illustrated in FIG. 1B. In a typical conventional single-stage ion mirror 100, employing a uniform electrical field, ions enter the electrical field of the reflector through an opening (typically a grid) in a grounded entrance electrode 102 along a trajectory 104 at an angle α relative to the normal 106 to the electrical field at the grounded entrance electrode 102. The component of electrical potential gradient in the direction normal to the entrance electrode 102 and a parallel end electrode 108 of the ion mirror 100 is the applied voltage V difference divided by the distance d between the end and entrance electrodes. This description assumes that the extension of the electrodes in the direction parallel to the electrical field (direction y, 110, in FIG. 1A) is large compared to the distance d so that the electrical field in the region sampled by the ions is essentially uniform and that the electrical field in the directions orthogonal to the x direction 112 in FIG. 1A is zero. The equations of motion of an ion in the electrical field of the single-stage ion mirror of FIG. 1A can be written as, $$a_x=-(zV/md) \tag{1}$$

$$a_y=0 \tag{2}$$

$$v_x=v_0\cos\alpha-a_xt=v_0\cos\alpha-(zV/md)t \tag{3}$$

$$v_y=v_0\sin\alpha \tag{4}$$

$$x=v_0t\cos\alpha-(zV/2md)t^2 \tag{5}$$

$$y=v_0t\sin\alpha \tag{6}$$

where the symbol m represents the mass of the ion; z the charge of the ion; V the potential difference between the entrance electrode 102 and end electrode 108; d the distance, along the direction x, between the entrance and end electrodes; α the angle of the entrance ion trajectory relative to the normal to the electrical field 106 at the entrance electrode 102 as illustrated in FIG. 1A; t is time; $v_0$ the velocity of the ion on entering the single-stage ion mirror 100; $a_x$ the acceleration of the ion in the x direction 112 of FIG. 1A; $a_y$ the acceleration of the ion in the y direction 110 of FIG. 1A; $v_x$ the velocity of the ion in the x direction 112 of FIG. 1A; $v_y$ the velocity of the ion in the y direction 110 of FIG. 1A; x the position of the ion in the x direction 112 of FIG. 1A at time t; and y the position of the ion in the y direction 110 of FIG. 1A (where t=0 is the time when the ion enters the electrical field and the origin of the x and y coordinate system of FIG. 1A is at the intersection 120 of the illustrated coordinates).

Solving equation (3) for t when $v_x$=0 gives the time, $t_1$, corresponding to maximum penetration into the electrical field.

$$t_1=(md/zV)v_0\cos\alpha. \tag{7}$$

Substituting for $t_1$ in equations (5) and (6) yields the ion position at time $t_1$:

$$x(t_1)=d(V_0/V)\cos^2\alpha, \tag{8}$$

$$y(t_1)=2d(V_0/V)\cos\alpha\sin\alpha=d(V_0/V)\sin 2\alpha, \tag{9}$$

where, $$V_0=(m/2z)v_0^2. \tag{10}$$

At time $2t_1$ the ions exit from the ion mirror (for the ion mirror of FIG. 1A when ion position x=0 again) with their velocity in the y direction unchanged and the magnitude of their velocity (speed) in the x direction equal their entrance velocity, but directed away from the entrance electrode 102 and at an angle 121 about equal to −α relative to the normal to the electrical field 106 at the entrance electrode 102. The distance traveled in the y direction at time $2t_1$ can be given by, $$y(2t_1)=2y(t_1) \tag{11}$$

The distance that an ion would travel in the x direction in time $t_1$ in the absence of the electrical field in the ion mirror, x(eff), can be given by, $$x(eff)=v_0t_1\cos\alpha=2d(V_0/V)\cos^2\alpha=2x(t_1). \tag{12}$$

Ions in the single-stage ion mirror follow a parabolic trajectory as schematically illustrated in FIG. 1A. Ions with a lower kinetic energy ($E_1$) following a trajectory 122 that is shallower (e.g., has a lower $x(t_1)$ value) than the trajectory 124 of ions with a higher kinetic energy ($E_2$). For purposes of determining the energy dependence of the ion flight time through the single-stage ion mirror and the trajectory of ions exiting the single-stage ion mirror, the actual ion trajectories can be replaced by those resulting from reflection from a virtual planar mirror inclined at an angle α relative to the incident ion trajectory. In this case the virtual mirror is placed at an effective distance, d(eff), relative to the entrance to the single-stage ion mirror. The effective distance, d(eff), can be given by $$d(eff)=x(eff)/\cos\alpha=2d(V_0/V)\cos\alpha. \tag{13}$$

As can be seen from equations (10) and (13), for ions with a given m/z value, those with a lower kinetic energy, e.g., $E_1$, have a shorter d(eff) than those with a higher kinetic energy, e.g., $E_2$, as illustrated in FIG. 1A where $d_{eff}(E_1)<d_{eff}(E_2)$.

For an ion traveling with constant velocity $v_0$ the time required to travel d(eff) is given by $$t(eff)=d(eff)/v_0=2d(V_0/V)(m/2zV_0)^{1/2}\cos\alpha=(md/zV)v_0\cos\alpha=t_1. \tag{14}$$

and the distance traveled in the y direction at time $2t_1$ can be given by, $$y(2t_1)=2y(t_1)=4d(V_0/V)\cos\alpha\sin\alpha=2d(eff)\sin\alpha=y(eff). \tag{15}$$

Thus, both the residence time of the ions in the single-stage ion mirror and the final direction of the ions after exiting the single-stage ion mirror are substantially identical to the hypothetical case of an ion elastically reflected from a planar mirror. The latter is physically impossible because it would require infinite acceleration, but it can allow the effects of combinations of mirrors to be illustrated and examined without introducing errors or approximations.

In a single-stage ion mirror the energy dispersion, the spatial dispersion of the ions in the y direction due to differences in ion kinetic energy on entering the ion mirror, can be given by the derivative of y with respect to the energy $V_0$. Differentiating equation (15) with respect to $V_0$ yields:

$$\partial y(eff)/\partial V_0=(4d/V)\cos\alpha\sin\alpha=(2d/V)\sin 2\alpha \tag{16}$$

Referring again to FIG. 1A, energy dispersion causes the initial coincident ion trajectories 104 for the lower and higher energy ions to be spatial dispersed resulting in an ion trajectory exiting the ion mirror which is dependent on the kinetic energy the ion had on entering the ion mirror. The trajectory for lower energy ions exiting the ion mirror thus intersects a surface substantially parallel to the image plane at a location 126 different from the location 128 where the trajectory for higher energy ions intersect the surface.

The focal distances for the single-stage ion mirror with uniform electric field of FIG. 1A are illustrated in FIG. 1B. In a field-free region the time required for an ion with velocity $v_0$ to travel a distance $d_{ff}$ can be given by $$t(ff)=d_{ff}/v_0. \quad (17)$$

For a mass analyzer system consisting of a field-free region and an ion mirror the total flight time, t(total), can be given by $$t(\text{total})=t(ff)+2t_1=d_{ff}/v_0+(2md/zV)v_0\cos\alpha. \quad (18)$$

The condition for first-order time focusing is that the derivative of t(total) with respect to velocity must vanish, that is, $$\partial t(\text{total})/\partial v_0=-d_{ff}/v_0^2+(2md/zV)\cos\alpha=0. \quad (19)$$

Substituting for $v_0$ from equation (10) and solving for $d_{ff}$ can give the time focus condition for a single-stage ion mirror, $$d_{ff}=4d(V_0/V)\cos\alpha=2d(eff). \quad (20)$$

Accordingly, as illustrated in FIG. 1B, ions at the focal plane at distance $d_2$ 152 on the incoming ion trajectory 154, an object plane of the ion mirror, are time focused at an image plane at $d_1$ 156 on the outgoing in trajectory 158 (i.e., the ions all arrive at the plane at distance $d_1$ at substantially the same time) such that, $$d_1+d_2=4d(V_0/V)\cos\alpha \quad (21)$$

where d, as described above with respect to FIG. 1A, is the distance between the entrance electrode 160 and the end electrode 162. The focal plane 156 at distance $d_1$ can be referred to as an image plane, and the focal plane 152 at distance $d_2$ as an object plane.

Parallel Ion Mirrors

To better understand the present teachings, an example of the behavior of ions in a conventional parallel arrangement of two ion mirrors 200 employing a uniform electrical field is illustrated in FIG. 2. Referring to FIG. 2, the two ion mirrors 202, 203 are arranged back-to-back with the entrance electrode 204 of the first ion mirror 202 facing the entrance electrode 205 of the second ion mirror 203, the distance between the entrance electrode 204 and end electrode 206 of the first ion mirror 202 and the distance between the entrance electrode 205 and end electrode 207 of the second ion mirror 203 are substantially the same, and the electrical potential difference (V) between the entrance electrode 204 and end electrode 206 of the first ion mirror 202 is the same as the electrical potential difference between the entrance electrode 205 and end electrode 207 of the second ion mirror 203. The ion residence time, the effective time focal distance and the energy dispersion of the combination of the two ion mirrors of FIG. 2 can be given by the equations for a single-stage ion mirror with a length equal to the sum of the two ion mirrors. The focal planes $d_1$ and $d_2$ of the combined ion mirrors of FIG. 2 are positioned relative to the combined ion mirrors, e.g., the object plane distance $d_2$ 208 is determined from the entrance to the first ion mirror 202 along the appropriate incident ion trajectory and the image plane distance $d_1$ 209 is determined from the entrance to the second ion mirror 203 along the appropriate outgoing ion trajectory. The total length of the ion path in the field free regions between the object plane 208 and the image plane 209, including the field-free space between the mirrors (204-205) is substantially equal to twice that for an individual mirror as given by equation (20). The ion trajectories 210, 213, 214, 215 illustrated in FIG. 2 are the trajectories for the hypothetical case of an ion elastically reflected from a planar mirror, which do not illustrate the parabolic flight path of ions within an ion mirror, but properly illustrate the ion trajectories outside of the ion mirrors.

One effect of using two parallel ion mirrors back-to-back, as illustrated in FIG. 2, is that an ion trajectory 213, 215 exiting the second ion mirror is parallel to and laterally displaced from the corresponding ion trajectory 210, 214 entering the first ion mirror. However, dispersion in the ion exit trajectory of ions with different entrance kinetic energies still occurs in the final ion trajectories. Ions with a lower kinetic energy follow a trajectory 210, 213 that is laterally displaced from the trajectory 214, 215 of ions with a higher kinetic energy due to energy dispersion.

Ion Optics Systems

A wide variety of ion mirrors can be employed in the ion optics systems of the present teachings including, but not limited to, single-stage, two-stage, and multi-stage ion mirrors. The electrical potential in a suitable ion mirror can be linear or non-linear. It is to be understood that the ion mirrors in the figures are illustrated schematically. For example, ion mirrors typically comprise multiple electrodes for establishing the electrical fields therein, and can contain guard electrodes to prevent stray electrical fields from entering field-free regions. The electrodes of a suitable ion mirror can comprise grids, can be gridless, or a mixture of gridded and gridless electrodes. Further, it is to be understood that although the entrance electrode electrical potential is often noted as zero, this is purely for convenience of notation and conciseness in the equations appearing herein. One of skill in the art will readily recognize that it is not necessary to the present teachings that the potential at an entrance electrode be at a true earth ground electrical potential. For example, the potential at the entrance electrode can be a "floating ground" with an electrical potential significantly above (or below) true earth ground (e.g., by thousands of volts or more). Accordingly, the description of an electrical potential as zero or as ground herein should not be construed to limit the value of an electrical potential with respect to earth ground in any way.

It is to be understood that the ion trajectories schematically illustrated in FIGS. 1B-9 are for the hypothetical case of an ion elastically reflected from a planar mirror, which do not illustrate the parabolic path of ions within an ion mirror, but properly illustrate the ion trajectory outside of an ion mirror.

Figure 3:
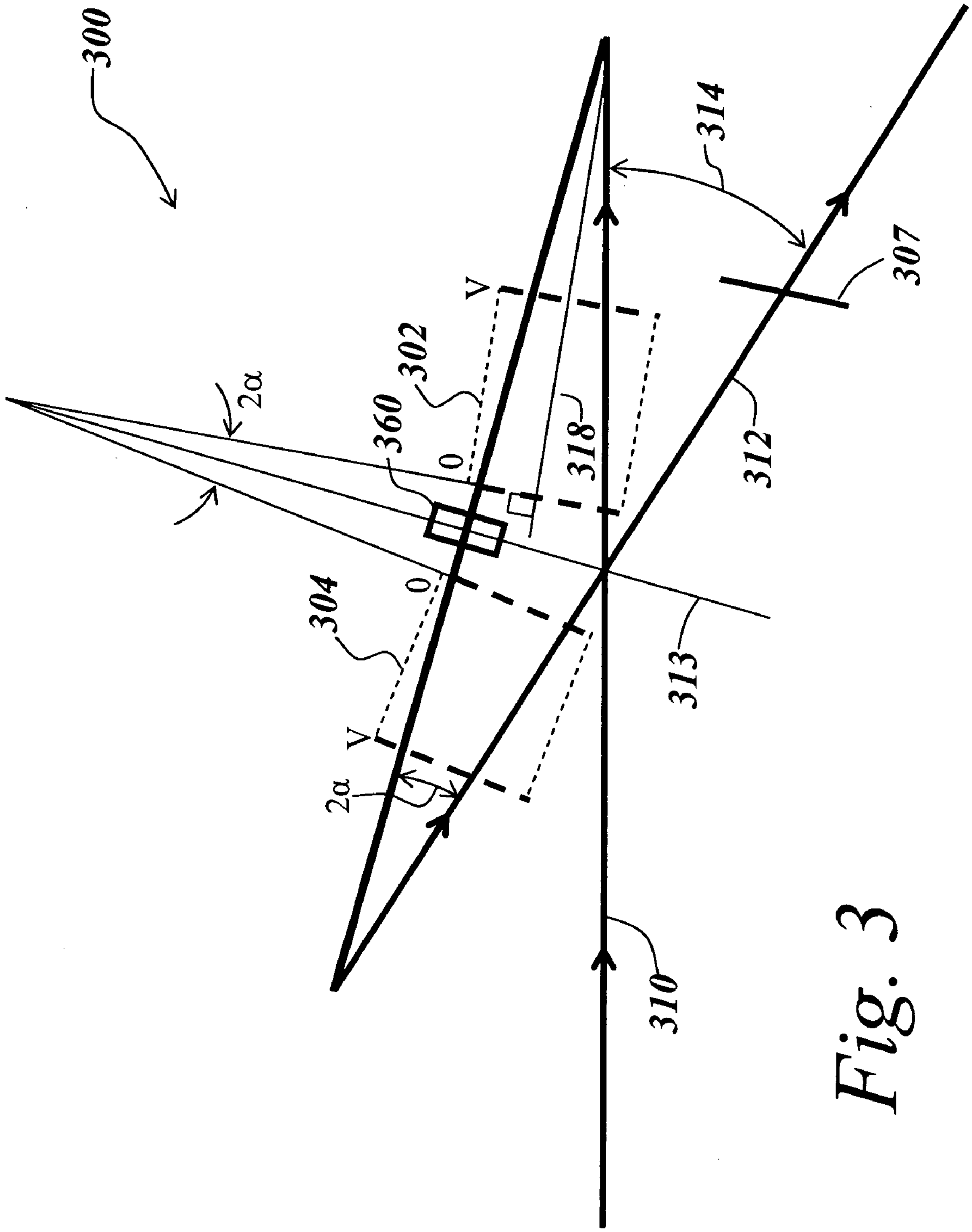
FIG. 3 schematically depicts various embodiments of an ion optics system comprising two symmetrically arranged ion mirrors and a representative ion trajectory.

Referring to FIG. 3, in various embodiments, an ion optics system 300 comprising an even number of ion mirrors comprises two ion mirrors arranged such that ions exit the ion optics system with substantially no spatial dispersion due to differences in the kinetic energy these ions had on entering the ion optics system. In various embodiments, a first ion mirror 302 and a second ion mirror 304 are arranged such that ions arrive at an image plane 307 with substantially no spatial dispersion due to differences. in the kinetic energy these ions had on entering the ion optics system 300.

The symmetric arrangement of two ion mirrors 302, 304, illustrated in FIG. 3, has a property that there is substantially no energy dispersion for the ion optics system 300, but the residence time and the effective time focal length is the same as that for a single ion mirror equal to the combined length of the two ion mirrors. Energy dispersion occurs in the first ion mirror 302, but this energy dispersion can be substantially compensated for in the second ion mirror 304 so that ions incident along an initial trajectory 310 exit along a final trajectory 312 that is substantially independent of the kinetic energy the ions had on entering the first ion mirror 302.

In various embodiments, the two ion mirrors are disposed on opposite sides of a first plane 313 (illustrated as the line-of-intersection of the first plane with the plane of the page) such that the first ion mirror 302 and the second ion mirror 304 are arranged substantially mirror-symmetric about the first plane 313. The angle 314 between the initial trajectory 310 and final trajectory 312 is equal to about four times the angle, α, of the initial trajectory 310 with respect the normal 318 to the entrance electrical field of the first ion mirror.

The angle, α, between the incident ion trajectory and the normal to the entrance electrode electrical field can be any angle. This incident angle can be selected, for example, based on a desired angle between the incident ion trajectory and the outgoing ion trajectory. For entrance electrode electrical fields which are not substantially planar, the plane tangent to the entrance electrode electrical field at the point or region of intersection of the incident ion trajectory can be taken as the plane of the entrance electrode electrical field. Although the angle between the incident trajectory and the normal can be any value, for practical reasons the minimum practical angle can be limited by structures used to shield the ion beam (whether a continuous or pulsed beam) in the field-free region from the ion mirror voltages. In general, the physical size of an ion mirror in relation to the field-free distance increases with increasing incident angle, while the applied voltage required for a given kinetic energy is generally decreases with increasing angle.

Figure 4:
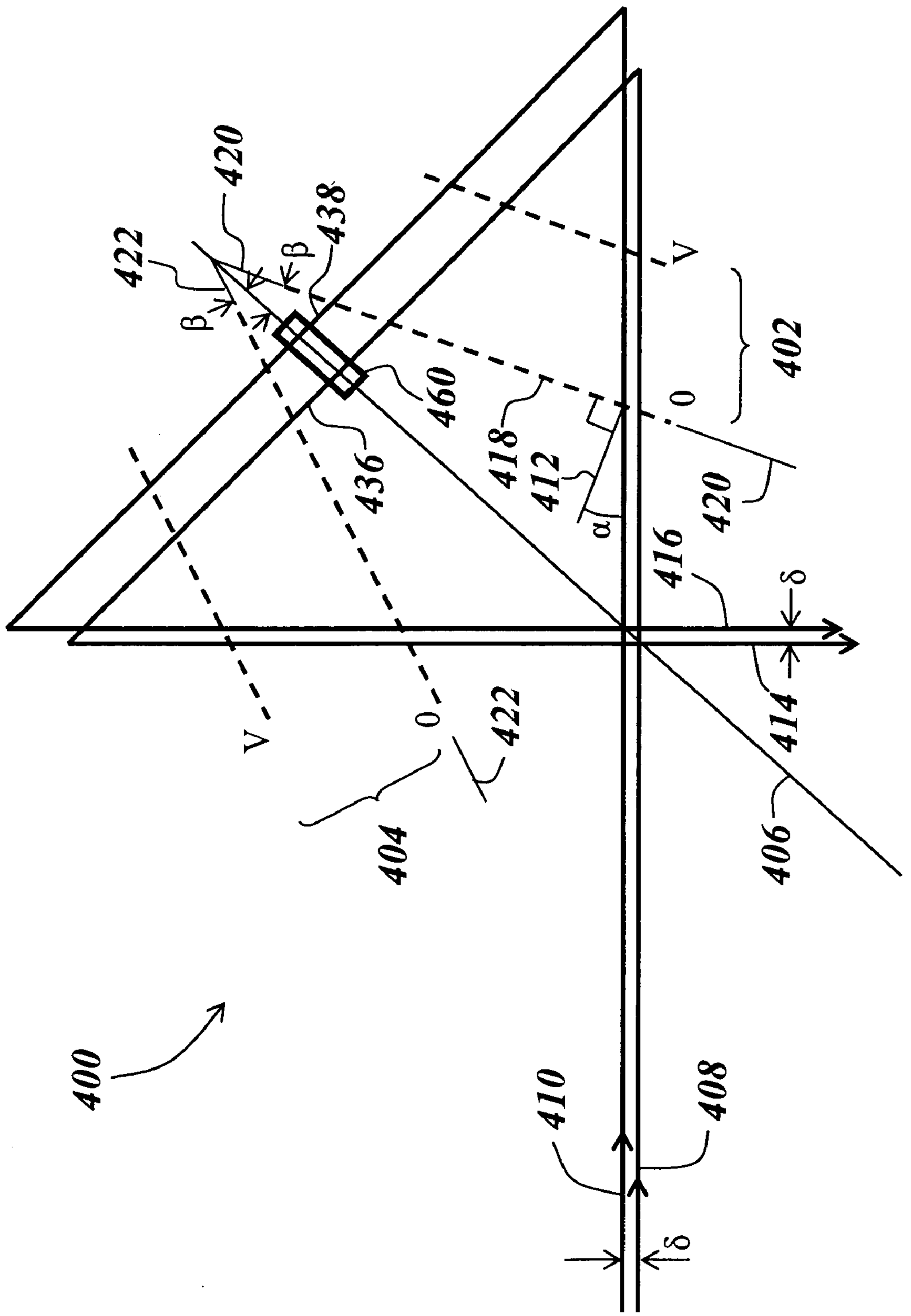
FIG. 4 schematically depicts various embodiments of an ion optics system comprising two symmetrically arranged ion mirrors and representative ion trajectories of ions with different kinetic energies, where an ion trajectory exiting the ion optics system is substantially perpendicular to the corresponding ion trajectory entering the ion optics system.

Referring to FIG. 4, in various embodiments, an ion optics system 400 according to the present teachings comprises a first ion mirror 402 and a second ion mirror 404 disposed on opposite sides of a first plane 406 (illustrated as the line-of-intersection of the first plane with the plane of the page) such that the first ion mirror 402 and the second ion mirror 404 are arranged substantially mirror-symmetric about the first plane 406. The ion trajectories illustrated in FIG. 4 are for an incident ion trajectory 408, 410 that intersects the entrance electrode electrical field at an angle, α, of about 22.5 degrees with respect to the normal 412 of the entrance electrode electrical field, resulting in an angle between the incident ion trajectory 408, 410 and the corresponding outgoing ion trajectory 414, 416 of about 90 degrees.

In various embodiments, the first ion mirror is positioned so that the plane of the entrance electrode electrical field of the first ion mirror lies substantially in a plane that intersects the first plane at about an angle β, and the entrance electrode electrical field of the second ion mirror lies substantially in a plane the that intersects the first plane at about an angle β. For entrance electrode electrical fields which are not substantially planar, the plane tangent to the entrance electrode electrical field at the point or region of intersection of the incident ion trajectory can be taken as the plane of the entrance electrode electrical field.

For example, referring again to FIG. 4, the electrical field of the entrance electrode 418 of the first ion mirror lies substantially in a plane 420 that intersects the first plane 406 at about an angle β=α=22.5 degrees and the entrance electrode electrical field of the second ion mirror also lies substantially in a plane 422 that intersects the first plane 406 at about an angle β=α=22.5 degrees.

Examples of ion trajectories for ions with two different ion kinetic energies $E_1$ and $E_2$ (where $E_1<E_2$) on entry to the first ion mirror 402 are also illustrated in FIG. 4. The incident portion 408 of the trajectory of the lower energy ions $E_1$ has been displaced a small distance δ from the incident portion 410 of the trajectory of the higher energy ions $E_2$ purely for clarity. As can be seen from FIG. 4, the energy dispersion of the first ion mirror causes an increase in the spatial separation between the trajectory of the lower energy ions 436 and that of the higher energy ions 438 exiting the first ion mirror 402. The second ion mirror 404 is positioned relative to the first ion mirror 402 such that the energy dispersion of the second ion mirror substantially compensates for the energy dispersion caused by the first ion mirror 402. As a result, in various embodiments, lower energy ion 410 and higher energy ion 416 trajectories exiting the second ion mirror exhibit substantially no energy dispersion, although any actual original displacement, δ, of these trajectories would be substantially maintained.

One or more of the incident trajectory angle α and the angle β can be greater than about 22.5 degrees. For example, referring to FIG. 5, in various embodiments, an ion optics system 500 comprises a first ion mirror 502 and a second ion mirror 504 disposed on opposite sides of a first plane 506 (illustrated as the line-of-intersection of the first plane with the plane of the page) such that the first ion mirror 502 and the second ion mirror 504 are arranged substantially mirror-symmetric about the first plane 506, and where the electrical field of the entrance electrode 507 of the first ion mirror lies substantially in a plane 508 that intersects the first plane 506 at about a 45 degree angle and the electrical field of the entrance electrode 509 of the second ion mirror also lies substantially in a plane 510 that intersects the first plane 506 at about a 45 degree angle. For incident ion trajectory angles of about α=45 degrees, such an ion optics system can be used to direct the output ions along an outgoing ion trajectory 520 that is 180 degrees (anti-parallel) from the incident ion trajectory 522. In addition, the outgoing ion trajectory can be displaced a selected distance Δ from the incident beam (without introducing energy dispersion to the output beam) by selecting the distance between the two ion mirrors; an increase in the distance between the ion mirrors increasing the displacement distance Δ.

Figure 5:
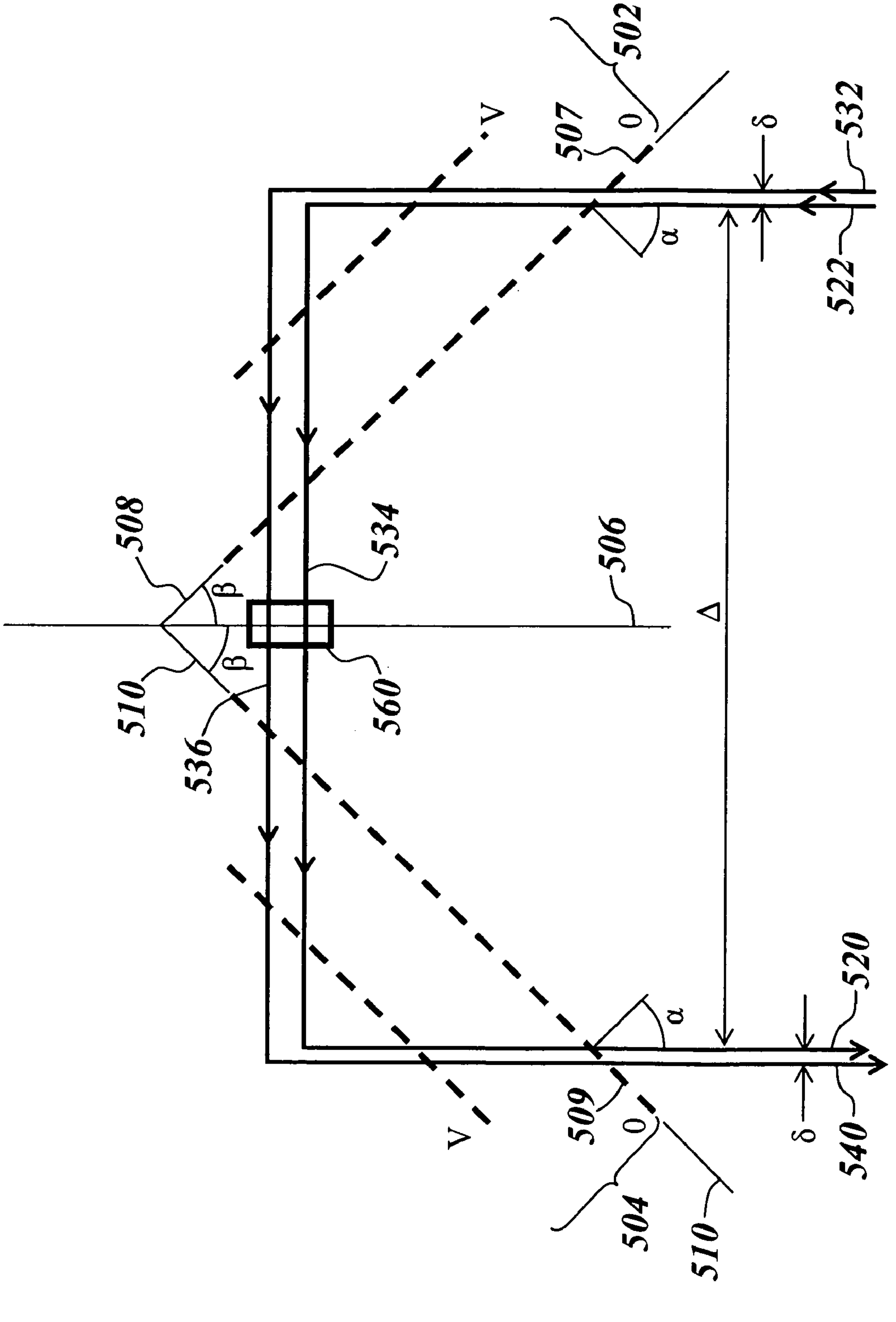
FIG. 5 schematically depicts various embodiments of an ion optics system comprising two symmetrically arranged ion mirrors and representative ion trajectories of ions with different kinetic energies, where an ion trajectory exiting the ion optics system is substantially anti-parallel to the corresponding ion trajectory entering the ion optics system.

Examples of ion trajectories for ions with two different ion kinetic energies $E_1$ and $E_2$ (where $E_1<E_2$) on entry to the first ion mirror 502 are also illustrated in FIG. 5. The incident portion 522 of the trajectory of the lower energy ions $E_1$ has been displaced a small distance δ from the incident portion 532 of the trajectory of the higher energy ions $E_2$ purely for clarity. As can be seen from FIG. 5, the energy dispersion of the first ion mirror causes an increase in the spatial separation between the trajectory of the lower energy ions 534 and that of the higher energy ions 536 exiting the first ion mirror 502. The second ion mirror 504 is positioned relative to the first ion mirror 502 such that the energy dispersion of the second ion mirror 504 substantially compensates for the energy dispersion caused by the first ion mirror 502. As a result, in various embodiments, lower energy ion 520 and higher energy ion 540 trajectories exiting the second ion mirror exhibit substantially no spatial dispersion due to differences in kinetic energy of the ions on entering the first ion mirror, although any actual original displacement, δ, of these trajectories would be substantially maintained.

In various embodiments, an ion selector can be positioned between the first ion mirror and the second ion mirror to prevent, for example, the transmission of ions with select kinetic energies from the first ion mirror to the second ion mirror. Such placement can take advantage of the energy dispersion of trajectories between the two ion mirrors. Suitable ion selectors include any structure that can prevent the transmission of ions between the first ion mirror and the second ion mirror based on ion position. Examples of suitable ion selectors include, but are not limited to, ion deflectors, and structures containing one or more openings (e.g., a slit, aperture, etc.). The openings can be constant or variable. Examples of suitable structures containing one or more openings include, but are not limited to, apertured plates, shutters, and choppers (e.g., rotary choppers). In some embodiments, the ion selector is positioned in a symmetry plane passing between the first and second ion mirrors.

Referring to FIGS. 3-5, in various embodiments, an ion selector 360, 460, 560 can be positioned between the first ion mirror 302, 402, 502 and the second ion mirror 304, 404, 504 to provide, for example, an ion optics system with an energy filter, which can use the energy dispersion of the first ion mirror to select ions yet still provide an outgoing ion trajectory that exhibits substantially no energy dispersion. For example, if a plate with small aperture or slit is placed in the first plane 313, 406, 506 then only ions within a narrow range of kinetic energies will be transmitted to the second ion mirror.

In various aspects, the present teachings provide an ion optics system comprising two or more of pairs of ion mirrors where the members of each pair of ion mirrors are disposed on opposite sides of a first plane such that the first member of a pair of ion mirrors has a position that is substantially mirror-symmetric about the first plane relative to the position of the second member of the pair. Referring to FIGS. 6-10, in various embodiments an ion optics system 600, 700, 800 comprises a first ion mirror 602, 702, 802 and a second ion mirror 604, 704, 804 disposed on opposite sides of a first plane 606, 706, 806 (illustrated as the line-of-intersection of the first plane with the plane of the page of the respective Figure) in a substantially mirror-symmetric relationship; and a third ion mirror 608, 708, 808 and a fourth ion mirror 610, 710, 810 disposed on opposite sides of the first plane 606, 706, 806 in a substantially mirror-symmetric relationship.

In various embodiments, the ion mirrors are arranged such that a trajectory 620, 720, 820 of an ion exiting the ion optics system (i.e., a focal surface of the last ion mirror 610, 710, 804 of the ion optics system exited by the ion) can be provided that intersects a surface substantially parallel to a focal surface 622, 722, 822 (e.g., a focal plane) of the fourth ion mirror 610, 710, 810 at a position that is substantially independent of the kinetic energy the ion had on entering the ion optics system (e.g., on entering the first ion mirror 602, 702, 802).

The ion mirrors can be arranged to provide a selected relative angle, α, between an incident ion trajectory and the normal to the entrance electrode electrical field. In FIGS. 6-9, the angle, α, is the angle between an incident ion trajectory and the normal to the entrance electrode electrical field of the first ion mirror. For entrance electrode electrical fields which are not substantially planar, the plane tangent to the entrance electrode electrical field at the point or region of intersection of the incident ion trajectory can be taken as the plane of the entrance electrode electrical field. Although the angle between the incident trajectory and the normal can be any value, for practical reasons the minimum and maximum practical angles can be limited.

In various embodiments, the ion mirrors are arranged such that an ion trajectory exiting the ion optics system is substantially anti-parallel (180 degrees) to the corresponding ion trajectory entering the ion optics system. For example, in FIG. 6 an ion trajectory 620 exiting the ion optics system 600 is substantially anti-parallel to the corresponding ion trajectory 623 entering the ion optics system. In various embodiments, the ion mirrors are arranged such that an ion trajectory exiting the ion optics system is substantially parallel to the corresponding ion trajectory entering the ion optics system. For example, in FIG. 7 an ion trajectory 720 exiting the ion optics system 700 is substantially parallel to the corresponding ion trajectory 723 entering the ion optics system.

Figure 6:
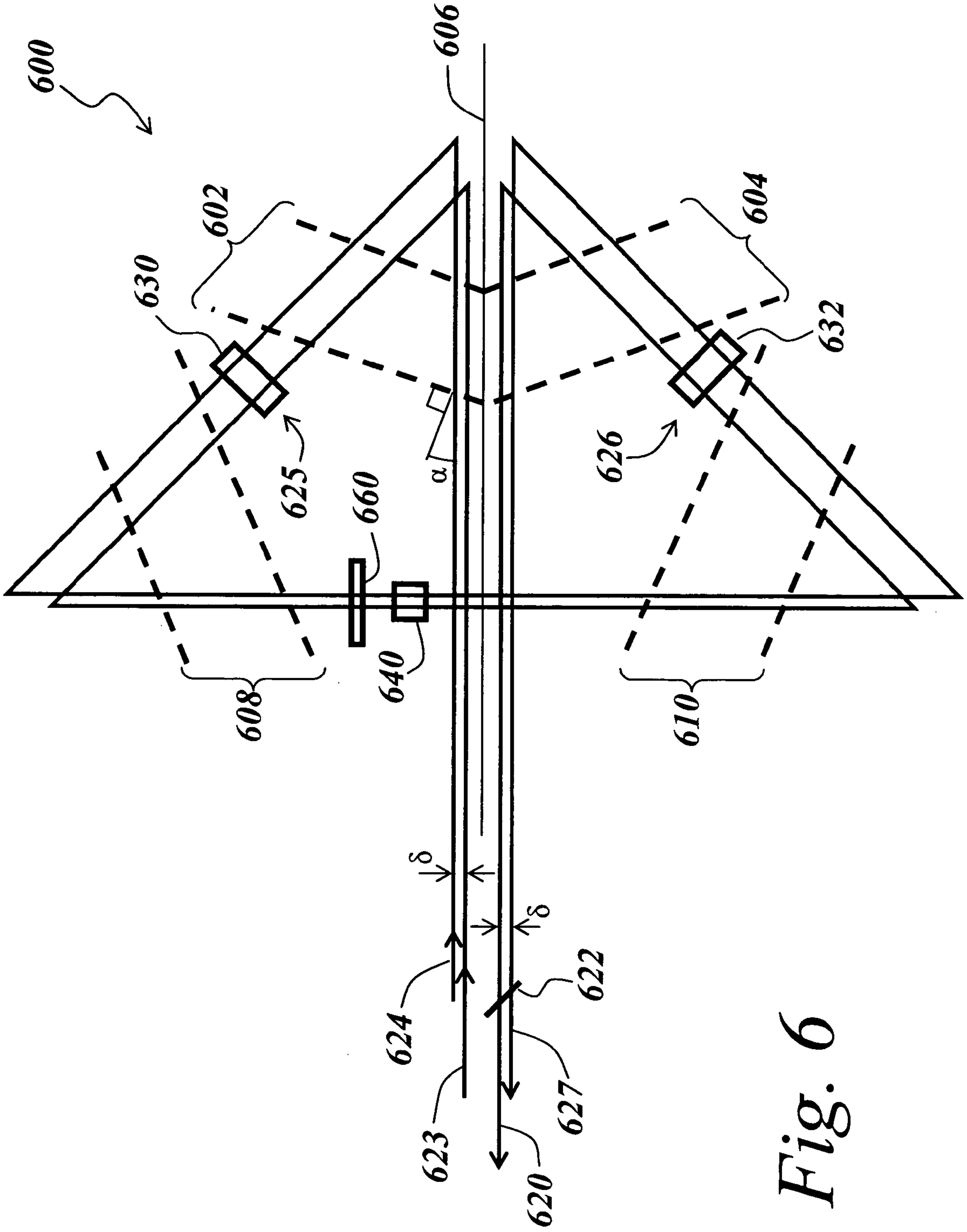
FIG. 6 schematically depicts various embodiments of an ion optics system comprising four symmetrically arranged ion mirrors and representative ion trajectories of ions different kinetic energies, where an ion trajectory exiting the ion optics system is substantially anti-parallel to the corresponding ion trajectory entering the ion optics system.
Figure 7:
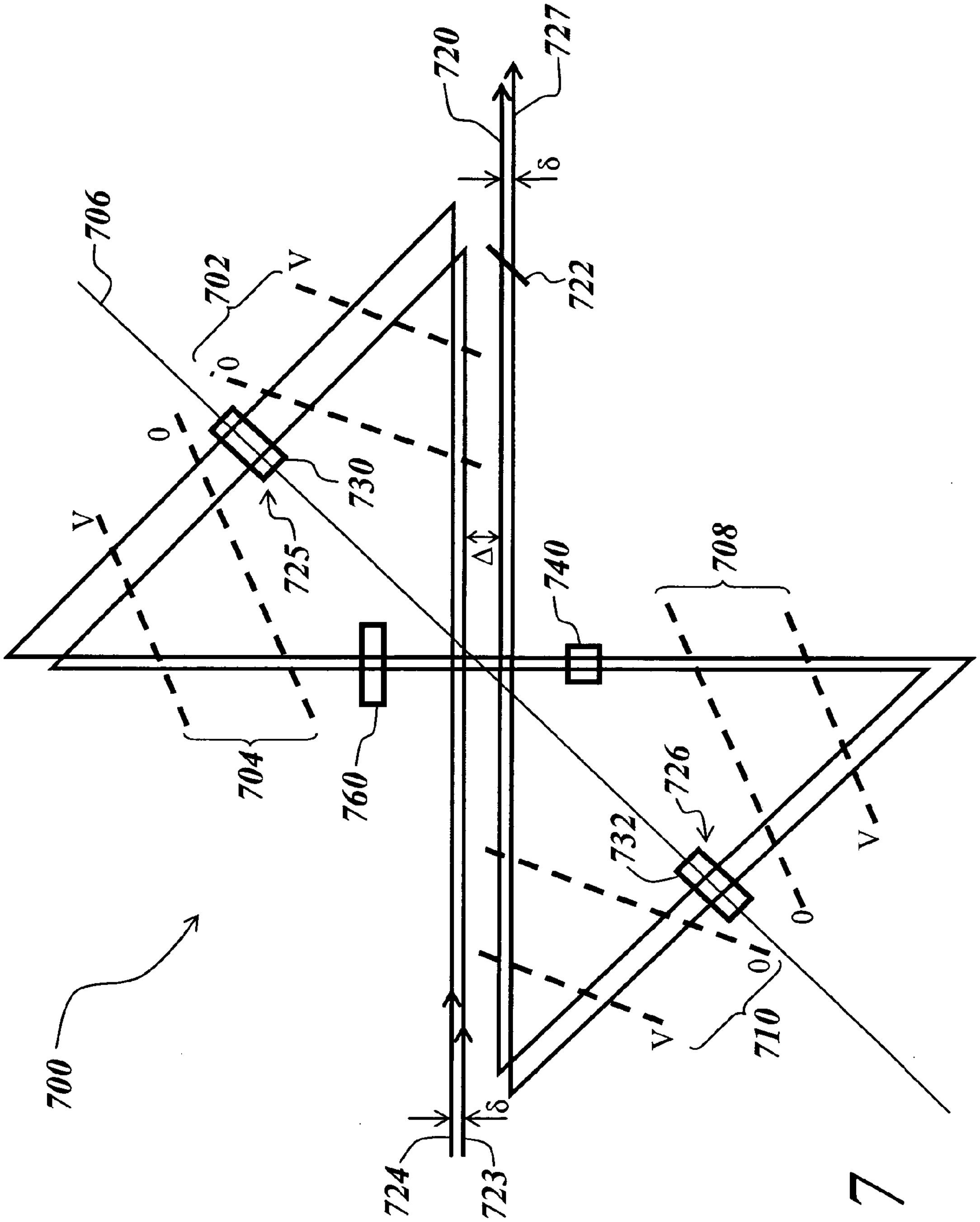
FIG. 7 schematically depicts various embodiments of an ion optics system comprising four symmetrically arranged ion mirrors and representative ion trajectories of ions with different kinetic energies, where an ion trajectory exiting the ion optics system is substantially parallel to the corresponding ion trajectory entering the ion optics system but laterally displaced therefrom.

In various embodiments, the ion optics systems of FIGS. 6 and 7 are combinations of two ion optics systems substantially similar to the ion optics system of FIG. 4 disposed substantially mirror-symmetric about the first plane. For example, the ion optics system of FIG. 6 can be viewed as a combination of a first ion optics system comprising a first pair of ion mirrors (comprising the first ion mirror and the third ion mirror) disposed substantially mirror-symmetric about the first plane 606 with respect to a second ion optics system comprising a second pair of ion mirrors (comprising the second ion mirror and the fourth ion mirror). In addition, the ion optics system of FIG. 6 can be viewed as an additive arrangement because ion trajectory exiting the ion optics system of FIG. 6 forms about a 180 degree angle to the corresponding ion trajectory entering the ion optics system (which is the addition of the about 90 degree angle formed between the ion exit trajectory and incident ion trajectory in the ion optics system of FIG. 4).

Similarly, the ion optics system of FIG. 7 can be viewed as a combination of a first ion optics system comprising a first pair of ion mirrors (comprising the first ion mirror and the second ion mirror) disposed substantially mirror-symmetric about the first plane 706 with respect to a second ion optics system comprising a second pair of ion mirrors (comprising the third ion mirror and the fourth ion mirror) positioned in a subtractive arrangement because ion trajectory exiting the ion optics system of FIG. 7 forms about a 0 degree angle to the corresponding ion trajectory entering the ion optics system.

The outgoing ion trajectory, for the ion optics systems of FIGS. 6 and 7, can also be displaced a selected distance Δ from the incident beam (without introducing energy dispersion to the output beam) by selecting the distance between pairs of ion mirrors (e.g., between the first and second pairs described above corresponding substantially to the ion optics system of FIG. 4); an increase in the distance between the ion mirrors increasing the displacement distance Δ.

Examples of ion trajectories for ions with two different ion kinetic energies $E_1$ and $E_2$ (where $E_1<E_2$) on entry to the first ion mirror 602, 702 are also illustrated in FIGS. 6 and 7. The incident portion 623, 723 of the trajectory of the lower energy ions $E_1$ has been displaced a small distance δ from the incident portion 624, 724 of the trajectory of the higher energy ions $E_2$ purely for clarity. As can be seen from the figures, energy dispersion causes an increase in the spatial separation between the trajectory of the lower energy ions and that of the higher energy ions at various places 625, 626, 725, 726 along the trajectories. The ion mirrors are positioned relative to each other to substantially compensate for the energy dispersion. As a result, in various embodiments, lower energy ion 620, 720 and higher energy ion 627, 727 trajectories exiting the fourth ion mirror exhibit substantially no spatial dispersion due to differences in the kinetic energy of the ions on entering the first ion mirror, although any actual original displacement, δ, of these trajectories would be substantially maintained.

Referring again to FIG. 6, in various embodiments, an ion optics system can further comprise an ion selector. Embodiments include, but are not limited to: an ion selector 630 positioned between the first ion mirror 602 and the third ion mirror 608; an ion selector 632 positioned between the second ion mirror 604 and the fourth ion mirror 610; or both. For example, in various embodiments, an ion selector 630 can be positioned between the first and third ion mirrors, an ion selector 632 can be positioned between the second and fourth ion mirrors, and an ion fragmentor 640 positioned between the third and fourth ion mirrors. In some embodiments, such an arrangement can provide, for example, a TOF-TOF capable of selecting the kinetic energy of the primary ion as well as ascertaining the kinetic energy distribution of the daughter ions.

In various embodiments, an ion selector 660 (e.g., a timed ion selector) can be positioned between the third and fourth ion mirrors. The ion selector 660 is disposed, in some embodiments, such that the location of the ion selector substantially coincides with the image surface (e.g., image plane) of a first ion optics system (e.g., the first ion mirror 602 and the third ion mirror 608 taken together), the symmetry plane 606, or both. In various embodiments, the trajectory of ions from the first ion optics system is substantially coaxial with an axis of the ion selector. In some embodiments, the ion selector is energized to transmit only ions within a selected m/z range. Accordingly, in various embodiments, an ion selector selects a primary ion (from the ions transmitted by the ion optics system) for introduction into an ion fragmentor 640. In various embodiments, a second ion optics system (e.g., the second ion mirror 604 and the fourth ion mirror 610 taken together) is configured select at least a portion of the fragment ions with a kinetic energy in a selected energy range for transmittal.

Figure 9:
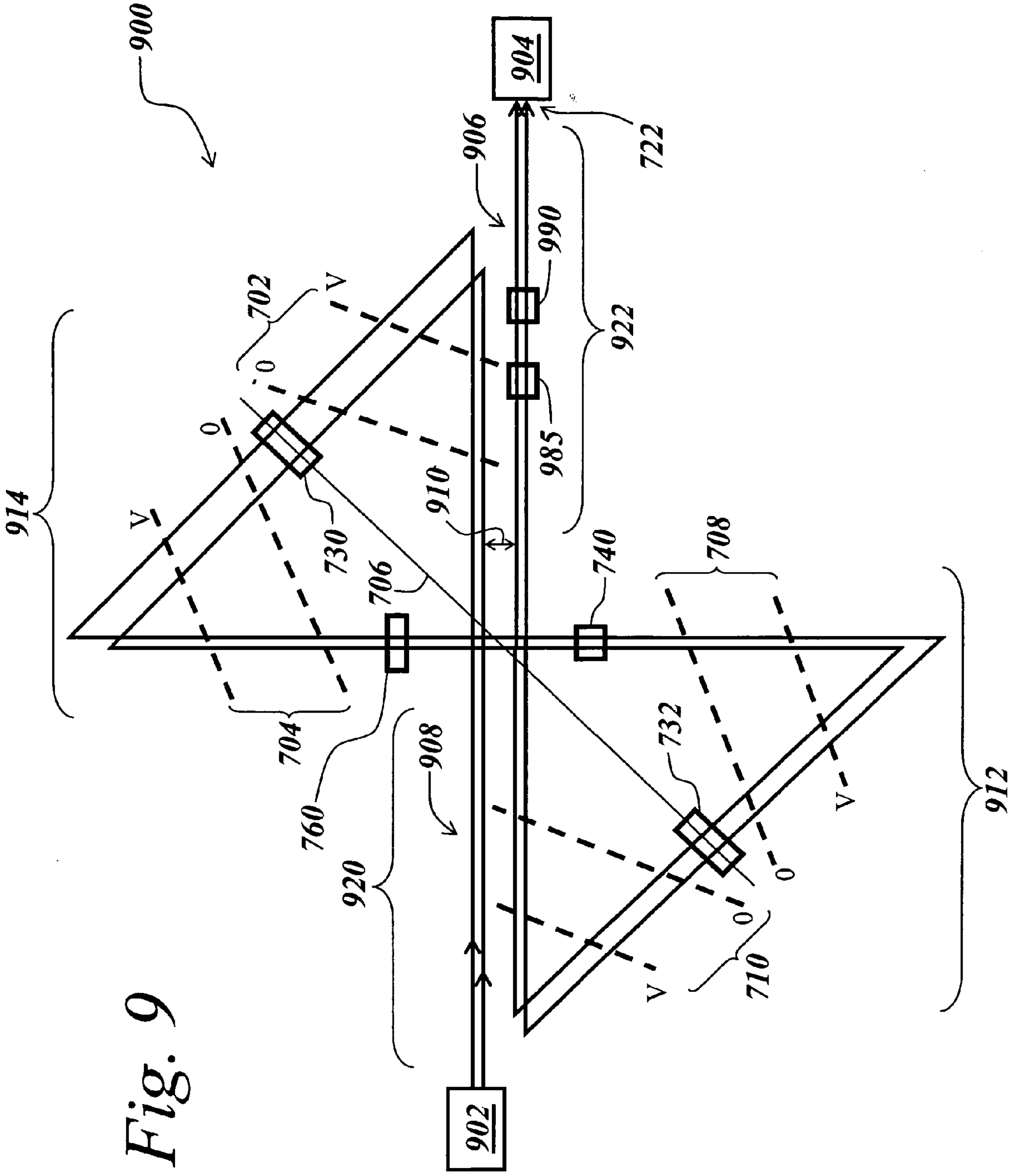
FIG. 9 schematically depicts a mass analyzer system comprising the ion optics system schematically depicted in FIG. 7.

Referring to FIGS. 7 and 9, in various embodiments, an ion optics system can further comprise an ion selector. Embodiments include, but are not limited to: an ion selector 730 positioned between the first ion mirror 702 and the second ion mirror 704; an ion selector 732 positioned between the third ion mirror 708 and the fourth ion mirror 710; or both. For example, in various embodiments, an ion selector 730 can be positioned between the first and second ion mirrors, an ion selector 732 can be positioned between the third and fourth ion mirrors, and an ion fragmentor 740 positioned between the second and third ion mirrors. In some embodiments, such an arrangement can provide, for example, a TOF-TOF capable of selecting the kinetic energy of the primary ion as well as ascertaining the kinetic energy distribution of the daughter ions.

In various embodiments, an ion selector 760 (e.g., a timed ion selector) can be positioned between the second and third ion mirrors. The ion selector 760 is disposed, in some embodiments, such that the location of the ion selector substantially coincides with the image surface (e.g., image plane) of a first ion optics system (e.g., the first ion mirror 702 and the second ion mirror 704 taken together), the symmetry plane 706, or both. In various embodiments, the trajectory of ions from the first ion optics system is substantially coaxial with an axis of the ion selector. In some embodiments, the ion selector is energized to transmit only ions within a selected m/z range. Accordingly, in various embodiments, an ion selector selects a primary ion (from the ions transmitted by the ion optics system) for introduction into an ion fragmentor 740. In various embodiments, a second ion optics system (e.g., the third ion mirror 708 and the fourth ion mirror 710 taken together) is configured select at least a portion of the fragment ions with a kinetic energy in a selected energy range for transmittal.

Referring again to FIGS. 8 and 10, in various embodiments, sets of ion mirrors on the same side of the first plane can make use of a common entrance electrode. For example, in some embodiments, the first ion mirror 802 and the third ion mirror 808 make use of a common entrance electrode 840 but use separate end electrodes 842, 844, and the second ion mirror 804 and the fourth ion mirror 810 make use of a common entrance electrode 850 but use separate end electrodes 852, 854. In various embodiments, the entrance electrodes 840, 850 are maintained at a ground potential (which can be a floating ground), and a different voltage is applied to the end electrodes 842, 844, 852, 854 causing the ions to travel in a parabolic path from entry into a set of ion mirrors to exit from the set of ion mirrors.

Figure 8:
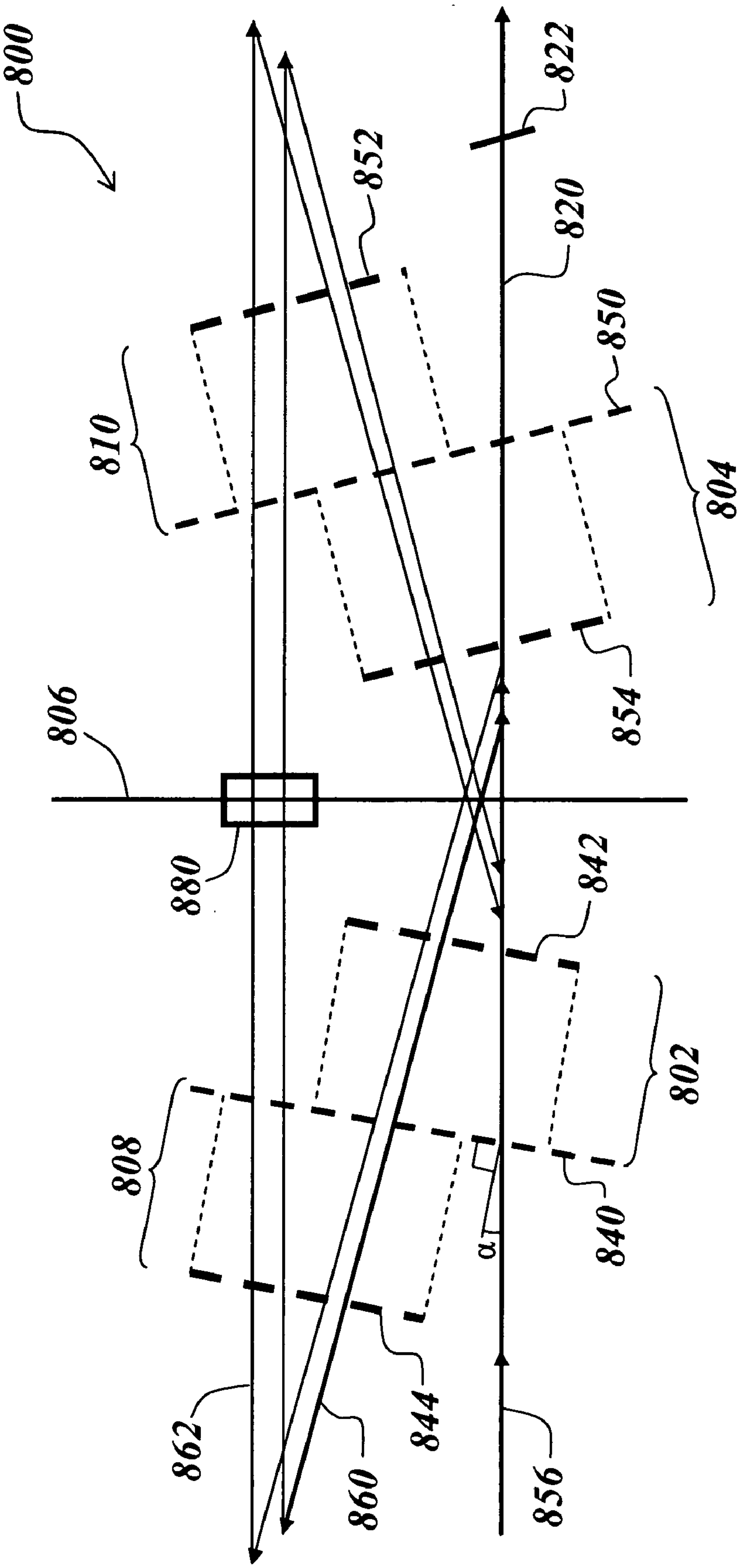
FIG. 8 schematically depicts various embodiments of an ion optics system comprising four symmetrically arranged ion mirrors and representative ion trajectories of ions with different kinetic energies, where an ion trajectory exiting the ion optics system is substantially parallel to the corresponding ion trajectory entering the ion optics system.

Examples of ion trajectories for ions with two different ion kinetic energies $E_1$ and $E_2$ (where $E_1 < E_2$) on entry to the first ion mirror 802 are illustrated in FIG. 8. In FIG. 8, the incident portion 856 of the trajectory of the lower energy ions $E_1$ has not been displaced with respect to the incident portion 856 of the trajectory of the higher energy ions. As can be seen from FIG. 8, the energy dispersion of the first and third ion mirrors causes an increase in the spatial separation between the trajectory of the lower energy ions 860 and that of the higher energy ions 862 exiting the third ion mirror 808. The second and fourth ion mirrors are positioned relative to the first and third ion mirrors such that the energy dispersion caused by the first and third ion mirrors is substantially compensated by the second and fourth ion mirrors. As a result, in various embodiments, lower energy ion and higher energy ion trajectories exiting the second ion mirror 804 exhibit substantially no spatial dispersion due to differences in the kinetic energy of the ions had on entering the first ion mirror 802.

In various embodiments, the ion mirrors can be arranged such that the ion trajectory exiting an ion optics system is substantially coincident with the corresponding ion trajectory entering the ion optics system and either substantially parallel or substantially anti-parallel thereto. For example, in FIG. 8 an ion trajectory 820 exiting the ion optics system 800 is substantially parallel to the corresponding ion trajectory 856 entering the ion optics system. The ion trajectory 820 exiting the ion optics system 800 can also be substantially coincident with the corresponding ion trajectory 856 entering the ion optics system. For example, in FIG. 8, the outgoing ion trajectory 820 is not substantially displaced in a direction substantially perpendicular to the incident ion trajectory 856, i.e., the displacement distance Δ is substantially equal to zero.

Figure 10:
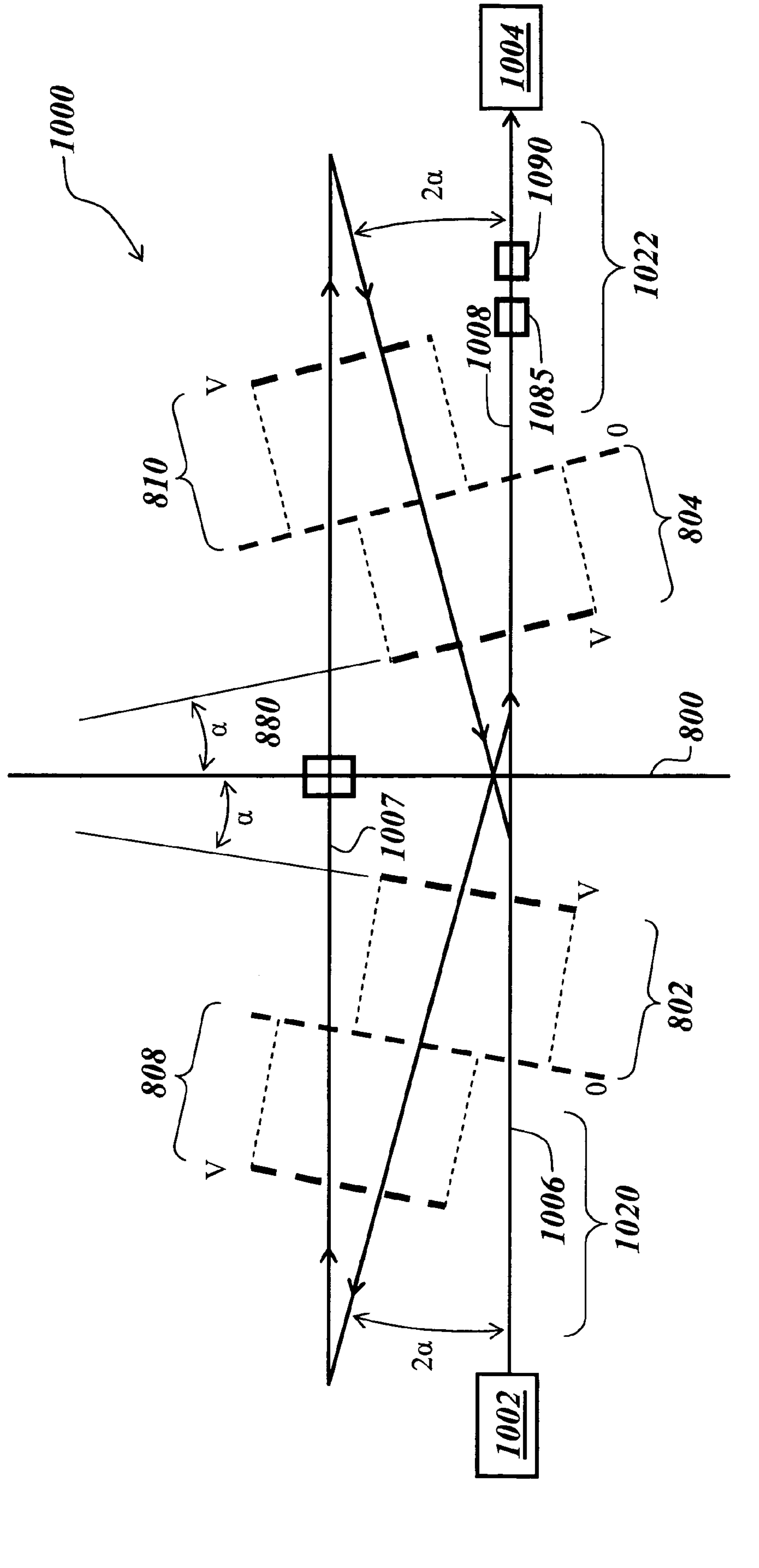
FIG. 10 schematically depicts a mass analyzer system comprising the ion optics system schematically depicted in FIG. 8.

Referring to FIGS. 8 and 10, in various embodiments, an ion selector 880 can be positioned between the third ion mirror 808 and the fourth ion mirror 810, to provide, for example, an ion optics system with an energy filter, which can use the combined energy dispersion of the first and third ion mirrors to select ions yet still provide an outgoing ion trajectory that exhibits substantially no energy dispersion. For example, if a plate with small aperture or slit is placed in the first plane 806 then only ions within a narrow range of kinetic energies will be transmitted to the fourth ion mirror 810.

In various aspects, the present teachings provide mass analyzer systems comprising a first ion optics system and one or more of an ion source, ion selector, ion fragmentor, and ion detector, ion guide, ion-focusing element, ion-steering element, and one or more mass analyzers (e.g., one or more of a time-of-flight, quadrupole, RF multipole, magnetic sector, electrostatic sector, ion trap, and ion mobility spectrometer). The first ion optics system comprising an even number of ion mirrors arranged such that a trajectory of an ion exiting the first ion optics system can be provided that intersects a surface substantially parallel to the image focal surface of the ion optics system at a position that is substantially independent of the kinetic energy the ion had on entering the first ion optics system. In various embodiments, the ion mirrors of the first ion optics system are arranged in pairs with the first member and second member of each pair are disposed on opposite sides of a first plane such that the first member of the pair has a position that is substantially mirror-symmetric about the first plane relative to the position of the second member of the pair. The mass analyzer systems can further comprise one or more ion guides (e.g., RF multipole guide, guide wire), ion-focusing elements (e.g., an einzel lens), and ion-steering elements (e.g., deflector plates).

Suitable ion sources include, but are not limited to, electron impact (EI) ionization, electrospray ionization (ESI), and matrix-assisted laser desorption ionization (MALDI) sources. Suitable ion detectors include, but are not limited to, electron multiplies, channeltrons, microchannel plates (MCP), and charge coupled devices (CCD).

Suitable ion fragmentors include, but are not limited to, those operating on the principles of: collision induced dissociation (CID, also referred to as collisionally assisted dissociation (CAD)), photoinduced dissociation (PID), surface induced dissociation (SID), post source decay, or combinations thereof. Examples of suitable ion fragmentors include, but are not limited to, collision cells (in which ions are fragmented by causing them to collide with neutral gas molecules), photodissociation cells (in which ions are fragmented by irradiating them with a beam of photons), and surface dissociation fragmentors (in which ions are fragmented by colliding them with a solid or a liquid surface).

In various embodiments, an ion optics system, a mass analyzer system, or both, of the present teachings comprises an ion selector. Although in many applications of TOF mass spectrometry it is generally desired to transmit all of the ions within the energy range produced by the ion source, in some applications only select ranges of ion kinetic energies are of interest. In addition to the ions produced directly in the ion source with differing kinetic energies, there may be ions present with lower kinetic energy due to, for example, loss of energy due to fragmentation of the ion after production in, for example, an ion source accelerating field or a field-free space following the ion source. In various embodiments, these ions can be removed by using an ion selector as an energy filter in an ion optics system of the present teachings.

Examples of suitable ion selectors include, but are not limited to, ion deflectors, and structures containing one or more openings (e.g., a slit, aperture, etc.). The openings can be constant or variable. Examples of suitable structures containing one or more openings include, but are not limited to, apertured plates, shutters, and choppers (e.g., rotary choppers).

In various applications of various embodiments comprising an ion selector in an ion optics system, it can be desirable to determine the kinetic energy distributions of the ions of differing masses. This can be accomplished, in various embodiments, by placing a narrow slit or aperture between two of the ion mirrors where the ion trajectories are spatially dispersed due to differences in kinetic energy such that only ions within a small energy increment are transmitted. For example, by measuring the intensities of the ion signals at the ion detector as a function of the voltage applied to the ion mirrors, the energy distributions for all of the ions detected can be measured, with the ions of differing masses arriving at the ion detector at different times.

In various embodiments, a mass analyzer system comprises an ion source, an ion optics system, an ion detector, and one or more mass analyzers (e.g., a substantially electrical field free region which can serve as a time-of-flight) where the ion optics system comprises an even number of ion mirrors arranged such that a trajectory of an ion exiting the ion optics system can be provided that intersects a surface substantially parallel to the image focal surface of the ion optics system at a position that is substantially independent of the kinetic energy the ion had on entering the ion optics system.

For example, adding a pulsed ion source, an ion detector, and a mass analyzer (e.g., an electrical field free region) to any of the configurations illustrated in FIGS. 3-8 can provide a TOF mass analyzer system. FIG. 9 schematically depicts various embodiments of a TOF mass analyzer system 900 based on one or more configurations of FIG. 7, while FIG. 10 schematically depicts various embodiments of a TOF mass analyzer system 1000 based on one or more configurations of FIG. 8.

Referring to FIG. 9, in various embodiments, the voltage applied to the first ion mirror 702 can be changed (e.g., turned off) to create a field-free region through the first ion mirror 702 and allow ions to travel from the ion source 902 to the ion detector 904 as in a simple linear TOF. Alternatively, in various embodiments, with the appropriate voltage applied to the ion mirrors the ions travel along parabolic paths within the ion mirrors 702, 704, 708, 710 to reach the ion detector 904 and the mass analyzer system can be used to accomplish one or more of same functions as in a conventional reflecting TOF analyzer but can also provide outgoing ion trajectories 906 that are substantially parallel to the incoming trajectories 908 and displaced by an amount 910 determined by the displacement of the second set of ion mirrors 912 relative to the first set of ion mirrors 914 and can provide outgoing ion trajectories 906 with substantially no spatial dispersion due to differences in the kinetic energy of the ions on entering the first ion mirror. A mass analyzer can be provided, for example, in the region 920 between the ion source and the ion optics system, the region 922 between the ion detector and the ion optics system, or both. The mass analyzer(s) can be, e.g., a substantially electrical field free region that can serve as a time-of-flight mass analyzer.

Referring to FIG. 10, in various embodiments, the mass analyzer 1000 can also be operated as linear TOF by setting the voltage of the ion mirrors 802, 804, 808, 810 to that of the field-free region, a field-free region can be created through the ion mirrors, allowing the ions to pass directly through the ion mirror electrodes and allow ions to travel from the ion source 1002 to the ion detector 1004. With the correct voltage applied to the ion mirrors 802, 804, 808, 810 ions travel the effective path 1006, 1007, 1008 schematically indicated in the FIG. 10 and the mass analyzer system can be used to accomplish one or more of same functions as in a conventional reflecting TOF analyzer but can also provide outgoing ion trajectories 1008 that are substantially parallel to the incoming trajectories 1006 with substantially no spatial dispersion due to differences in the kinetic energy the ions had on entering the first ion mirror. A mass analyzer can be provided, for example, in the region 1020 between the ion source and the ion optics system, the region 1022 between the ion detector and the ion optics system, or both. The mass analyzer(s) can be, e.g., a substantially electrical field free region that can serve as a time-of-flight mass analyzer.

In various aspects, the present teachings provide mass analyzer systems comprising a ion optics system and a mass analyzer. The ion optics system comprising an even number of ion mirrors arranged such that a trajectory of an ion exiting the ion optics system can be provided that intersects a surface substantially parallel to the image focal surface of the ion optics system at a position that is substantially independent of the kinetic energy the ion had on entering the first ion optics system; and the mass analyzer comprising, for example, at least one of a time-of-flight, ion trap, quadrupole, RF multipole, magnetic sector, electrostatic sector, and ion mobility spectrometer.

In various embodiments, an ion fragmentor is disposed between the ion optics system and the mass analyzer. The ion fragmentor is disposed, in some embodiments, such that the entrance to the ion fragmentor substantially coincides with the image surface (e.g., image plane) of the ion optics system. In some embodiments, ion fragmentor is disposed such that the exit of the ion fragmentor substantially coincides with a focal surface (e.g., an object focal surface) of the mass analyzer.

In various embodiments, an ion selector can be disposed between ion mirrors of the first ion optics system to prevent, for example, the transmission of ions with select kinetic energies between two ion mirrors of the first ion optics system, and thereby, select the range of ion kinetic energies transmitted by the first ion optics system. Accordingly, in various embodiments, the first ion optics system selects a primary ion, with a kinetic energy in a selected energy range, for introduction into an ion fragmentor and a mass analyzer is configured to analyze at least a portion of the fragment ion spectrum.

Referring again to FIGS. 9 and 10, in various embodiments, an ion selector 985, 1085 (e.g., a timed-ion selector) is disposed between an ion optics system (the first through fourth ion mirrors 702, 704, 708, 710, collectively, in FIG. 9, and 802, 804, 808, 810 collectively, in FIG. 10); and a mass analyzer (disposed for example in a region 922, 1022 between the ion optics system and the ion detector). The ion selector is disposed, in some embodiments, such that the location of the ion selector substantially coincides with the image surface (e.g., image plane) of the ion optics system. In various embodiments, the trajectory of ions from the ion optics system is substantially coaxial with an axis of the ion selector. In some embodiments, the ion selector is energized to transmit only ions within a selected m/z range. Accordingly, in various embodiments, an ion selector 985, 1085 selects a primary ion (from the ions transmitted by the ion optics system) for introduction into an ion fragmentor 990, 1090, and a mass analyzer is configured to analyze at least a portion of the fragment ions.

Referring to FIG. 9, in various embodiments, one or more ion selectors 730, 732 can be disposed between ion mirrors of the ion optics system to select the range of ion kinetic energies transmitted by the ion optics system. Accordingly, in various embodiments, an ion optics system with an ion selector (e.g., 730, 732) selects an ion, with a kinetic energy in a selected energy range, and a second ion selector 985 (e.g. a timed-ion selector), disposed between the ion optics system and a mass analyzer, selects a primary ion for introduction into an ion fragmentor 990 and the mass analyzer is configured to analyze at least a portion of the fragment ions.

Figure 11:
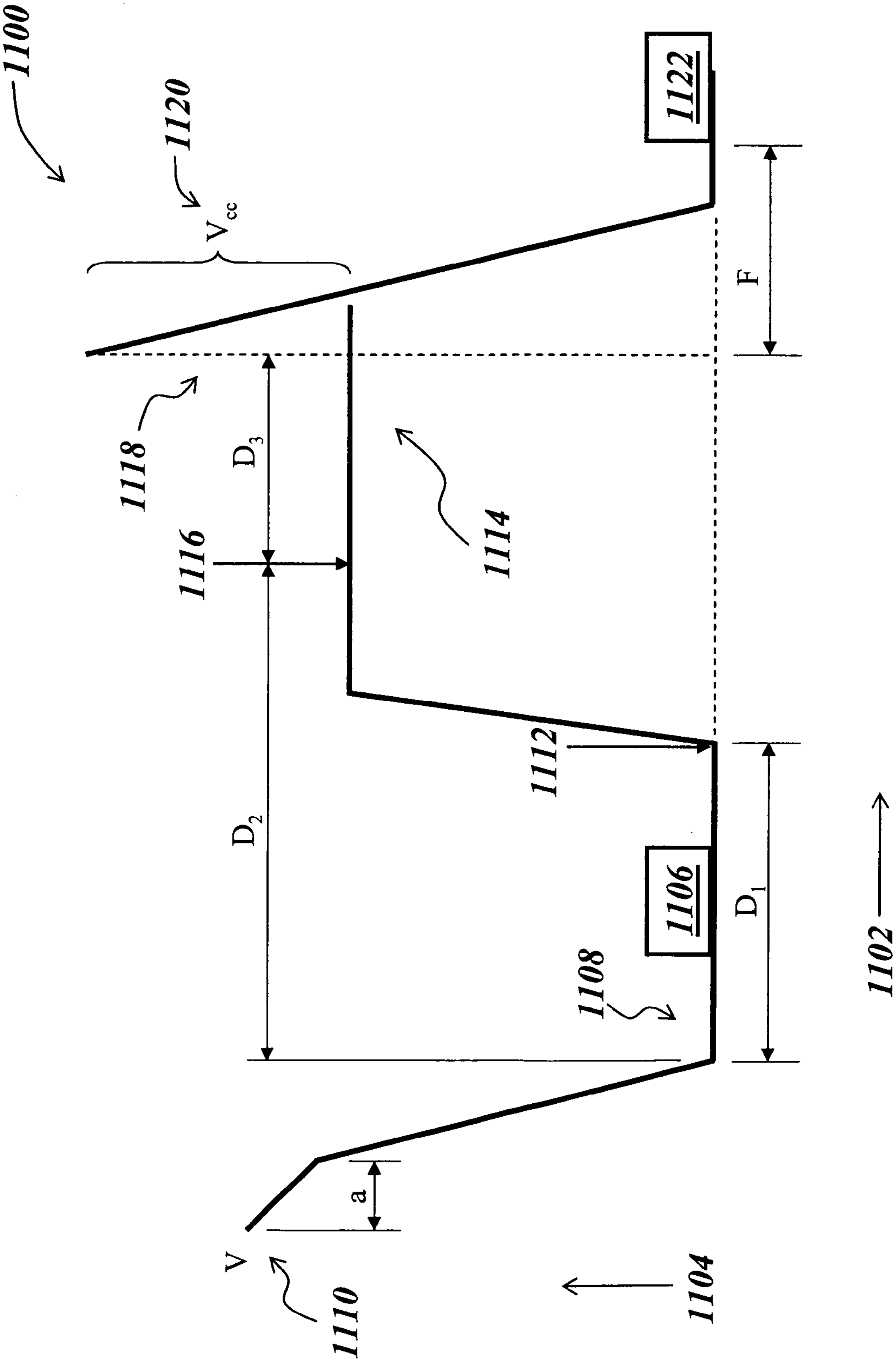
FIG. 11 schematically depicts a potential diagram of a mass analyzer system incorporating an ion optics system substantially as schematically depicted in FIG. 8.

In various embodiments, an ion optics system can be disposed in the field free-region of a mass spectrometer to provide an ion beam with substantially no energy dispersion. For example, adding any of the ion optics system configurations illustrated in FIGS. 3-8 into a field-free region of a TOF mass analyzer can provide a TOF mass analyzer system. An example of inserting an ion optics system is illustrated in FIG. 11 as a schematic potential energy diagram 1100 of the modified TOF mass analyzer, where the x coordinate 1102 represents position along the ion trajectory and the y coordinate 1104 represents ion energy. In various embodiments, an ion optics system 1106 of the present teachings can be disposed in a first field-free region 1108 of a TOF-TOF mass analyzer to provide a TOF-TOF mass analyzer system. In various embodiments, ions are produced from a pulsed ion source with energy V 1110 and the operating conditions of the source can be selected so that the ions of a particular m/z value are focused in time at a timed ion selector (TIS) positioned to select ions based on arrival time at the TIS, and hence m/z value. The timed ion selector can be located either in a first field-free region 1108 at distance $D_1$ from the ion source 1112 or in the second field-free region 1114 at distance $D_2$ from the ion source 1116. A portion of the first field free region 1108 between the ion source and ion optics system 1106 can serve, e.g., in various embodiments as a time-of-flight analyzer. In various embodiments, the ion source is a delayed extraction pulsed ion source and the object plane of the ion optics system is placed at a focus (e.g., a time-lag focus) of the ion source.

Selected ions and fragments thereof produced in the second field-free region (e.g. using an ion fragmentor) can be further accelerated after they travel an additional distance $D_3$ by a second ion accelerator 1118 providing additional energy Vcc 1120. In various embodiments, selected ions and fragments thereof can be focused at a distance F from the entrance to second ion accelerator 1118. The accelerated ions and fragments can be separated and analyzed in a second mass analyzer 1122. The distance F can be the distance to a focal plane of the second mass analyzer 1122. The timed ion selector, together with the first field-free region 1108 and the second mass analyzer 1122 can comprises a tandem TOF-TOF mass analyzer in which the first stage of the analyzer for selecting ions is a linear TOF (first field-free region 1108) and where the second stage of the analyzer (second mass analyzer 1122), for fragments analysis, can be a linear or reflecting analyzer.

Use of a linear analyzer in the first stage of such an instrument can, however, reduce resolution in situations where the ion source provides ions with the same m/z value but with differing kinetic energies. For example, the energy distribution of ions produced by a MALDI source is typically dependent on the laser fluence, properties of the MALDI matrix and other variables, so that the arrival time distribution of ions of a particular m/z value at the timed ion selector can vary in an uncontrolled fashion. Although a conventional reflecting analyzer could be used for the first stage to improve resolution, the outgoing trajectories of conventional reflecting analyzers are dependent on the kinetic energies of the incoming ions even though the incoming ions may be confined to a beam of very small diameter. Such energy dispersion creates an ion beam that cannot be focused effectively to allow high transmission efficiency through the remainder of a typical TOF-TOF instrument. In various embodiments, use of an ion optics system according to the present teachings inserted in the first field-free region can facilitate overcoming this problem.

For example, a first ion optics system 1106 (comprising an even number of ion mirrors arranged such that a trajectory of an ion exiting the first ion optics system can be provided that intersects a surface substantially parallel to the image focal surface of the first ion optics system at a position that is substantially independent of the kinetic energy the ion had on entering the first ion optics system) can be inserted into the first field-free region 1108 of the TOF-TOF system. In this configuration the time focus for the ion source plus the time focus for the first ion optics system 1106 is chosen so that ions of a selected mass may be focused in time at the timed ion selector (TIS). Normally, the focal length for the first ion optics system 1106 is chosen to be significantly longer than that for the ion source so that effects of source conditions on focus can be reduced.

Aspects, embodiments, and features of the present teachings may be further understood from the following examples, which should not be construed as limiting the scope of the present teachings in any way.

EXAMPLES

Figure 12A:
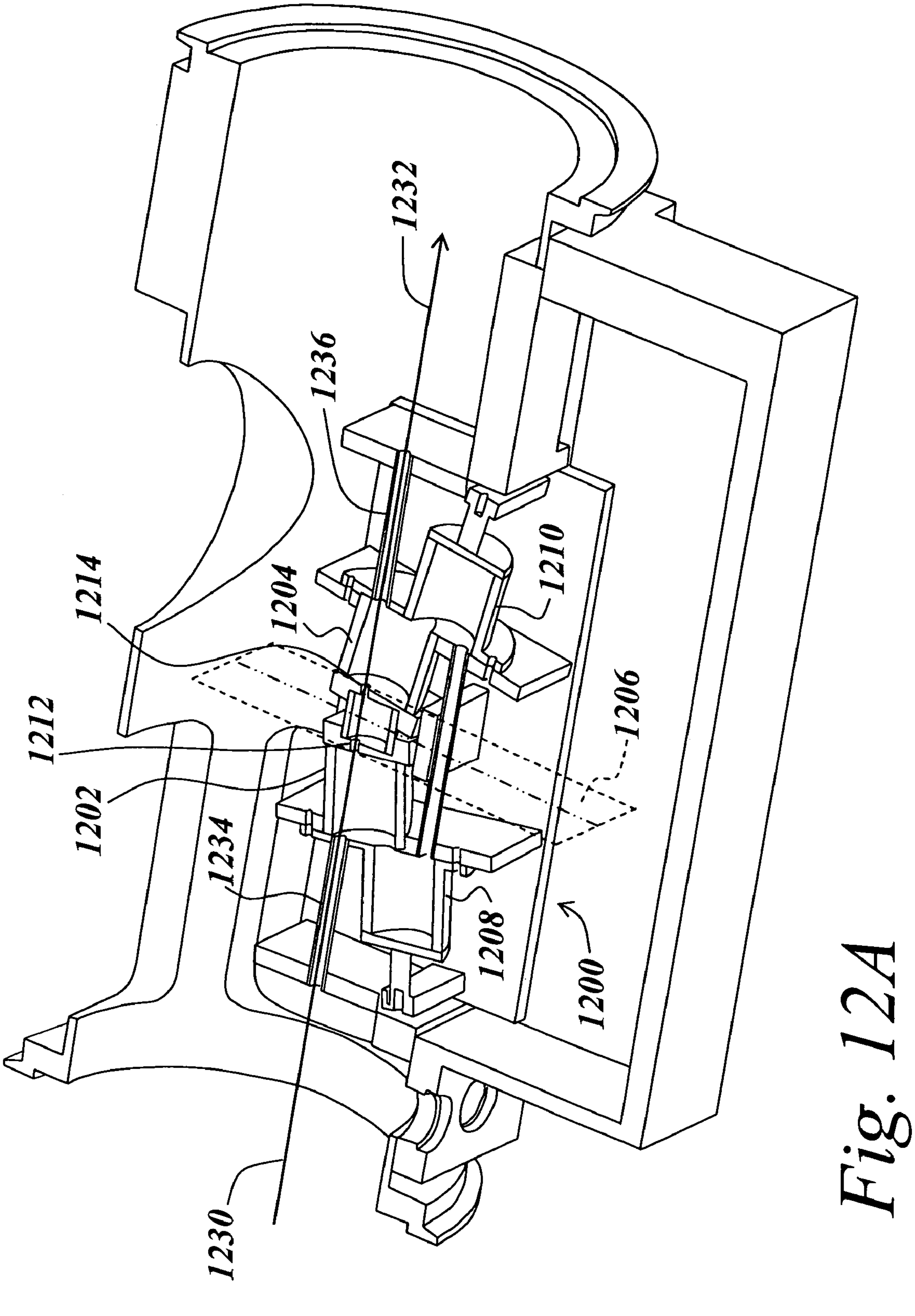
FIGS. 12A and 12B are cross sectional representations of a portion of a mass analyzer system with an ion optics system comprising four symmetrically arranged ion mirrors.
Figure 12B:
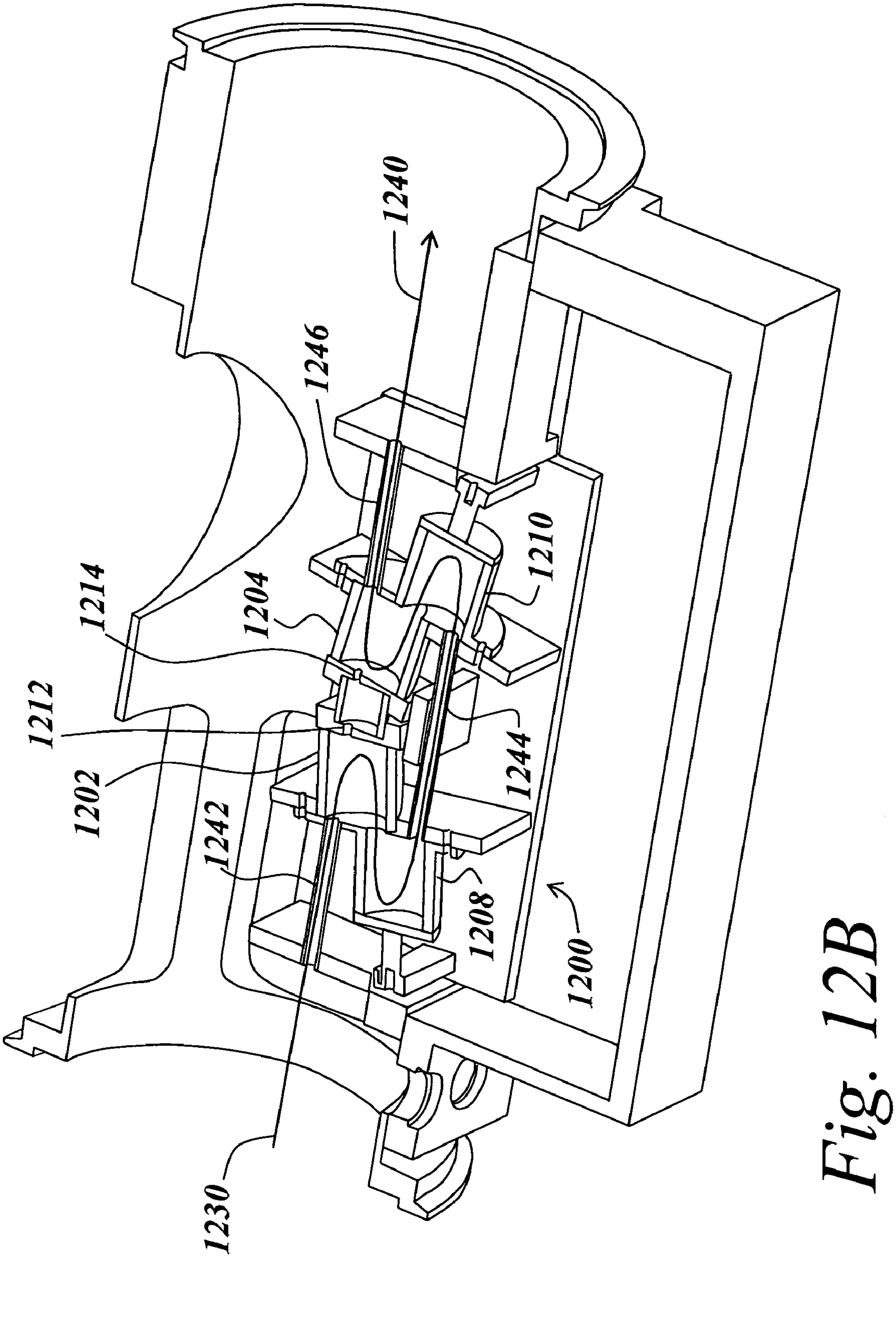

Examples 1 and 2 present results obtained with an Applied Biosystems® 4700 Proteomics Analyzer (sold by Applied Biosystems, 850 Lincoln Centre Drive, Foster City, Calif. 94404, U.S.A.) modified to include in the first field-free region an ion optics system substantially similar to that illustrated in FIGS. 12A and 12B (which is schematically substantially similar to the ion optics system of FIG. 8).

Referring to FIGS. 12A and 12B, the inserted ion optics system 1200 comprises a first single-stage ion mirror 1202 and a second single-stage ion mirror 1204 disposed on opposite sides of a first plane 1206 in a substantially mirror-symmetric relationship; and a third single-stage ion mirror 1208 and a fourth single-stage ion mirror 1210 disposed on opposite sides of the first plane in a substantially mirror-symmetric relationship. To compare the operation of the unmodified 4700 Proteomics Analyzer to that utilizing the inserted ion optics system 1200, the electrical potentials of the ion mirrors 1202, 1204, 1208, 1210 were set to that of the field-free region and small apertures 1212 and 1214 in the end electrodes of mirrors 1202 and 1204, respectively, allowed ions to be transmitted through the ion optics system. Referring to FIG. 12A, in this "unmodified 4700 Proteomics Analyzer" operational mode, ions travel from an ion source region 1230 along an ion trajectory 1232 through the field-free region with a flight path unmodified by the inserted ion optics system 1200, passing through shielding tubes 1234, 1236, before proceeding to the timed ion selector and second mass analyzer.

Referring to FIG. 12B, when the inserted ion optics system 1200 is utilized, ions travel from an ion source region 1230 along an ion trajectory 1240 through the ion mirrors 1202, 1204, 1208, 1210 and through field-free regions 1242, 1244, 1246 (protected from stray electrical fields by shielding tubes) before proceeding to the timed ion selector and second mass analyzer. In various embodiments, an ion selector can be placed in the field free region between the third ion mirror 1208 and the fourth ion mirror 1210 to provide, for example, an energy filter.

Example 1

TOF Measurements

This example presents experimental data obtained with the above modified 4700 Proteomics Analyzer operated as a TOF mass analyzer in "unmodified 4700 Proteomics Analyzer" operational mode and in a mode utilizing the inserted ion optics system 1200. In FIGS. 13A-16B, unmodified 4700 Proteomics Analyzer operational mode data is noted as "4700 Linear Spec." and data for operation in a mode utilizing the inserted ion optics system 1200 is noted as "4700 Reflector Spec." These data were obtained with the ion detector placed at approximately the location of the timed-ion-selector in the unmodified 4700 Proteomics Analyzer.

FIGS. 13A-D compare MALDI-TOF measurements of a matrix dimer (m/z 379.1) taken for two different laser fluences; low, (FIGS. 13A, 13B) and high (FIGS. 13C,13D); and compares spectra obtained in "unmodified 4700 Proteomics Analyzer" operational mode (FIGS. 13A, 13C) to that for operation in a mode utilizing the inserted ion optics system 1200 (FIGS. 13B, 13D).

FIGS. 14A-D compare MALDI-TOF measurements of des-Arg bradykinin (m/z 904.46) taken for two different laser fluences; low, (FIGS. 14A, 14B) and high (FIGS. 14C,14D); and compares spectra obtained in "unmodified 4700 Proteomics Analyzer" operational mode (FIGS. 14A, 14C) to that for operation in a mode utilizing the inserted ion optics system 1200 (FIGS. 14B, 14D).

FIG. 15A depicts a MALDI-TOF mass spectrum for a mixture of standard peptides including des-Arg bradykin, angiotensin I, and glu I fibrinopeptidtein obtained at high laser intensity utilizing the inserted ion optics system 1200, FIGS. 15B-15D depicting expanded portions of FIG. 15A in the regions of the protonated molecular ions at nominal m/z values of about 904, 1296, and 1570, respectively.

FIG. 16A depicts an expanded view of a portion of the spectrum of FIGS. 15A, and 16B is a similar result obtained at a lower laser fluence.

Figure 13:
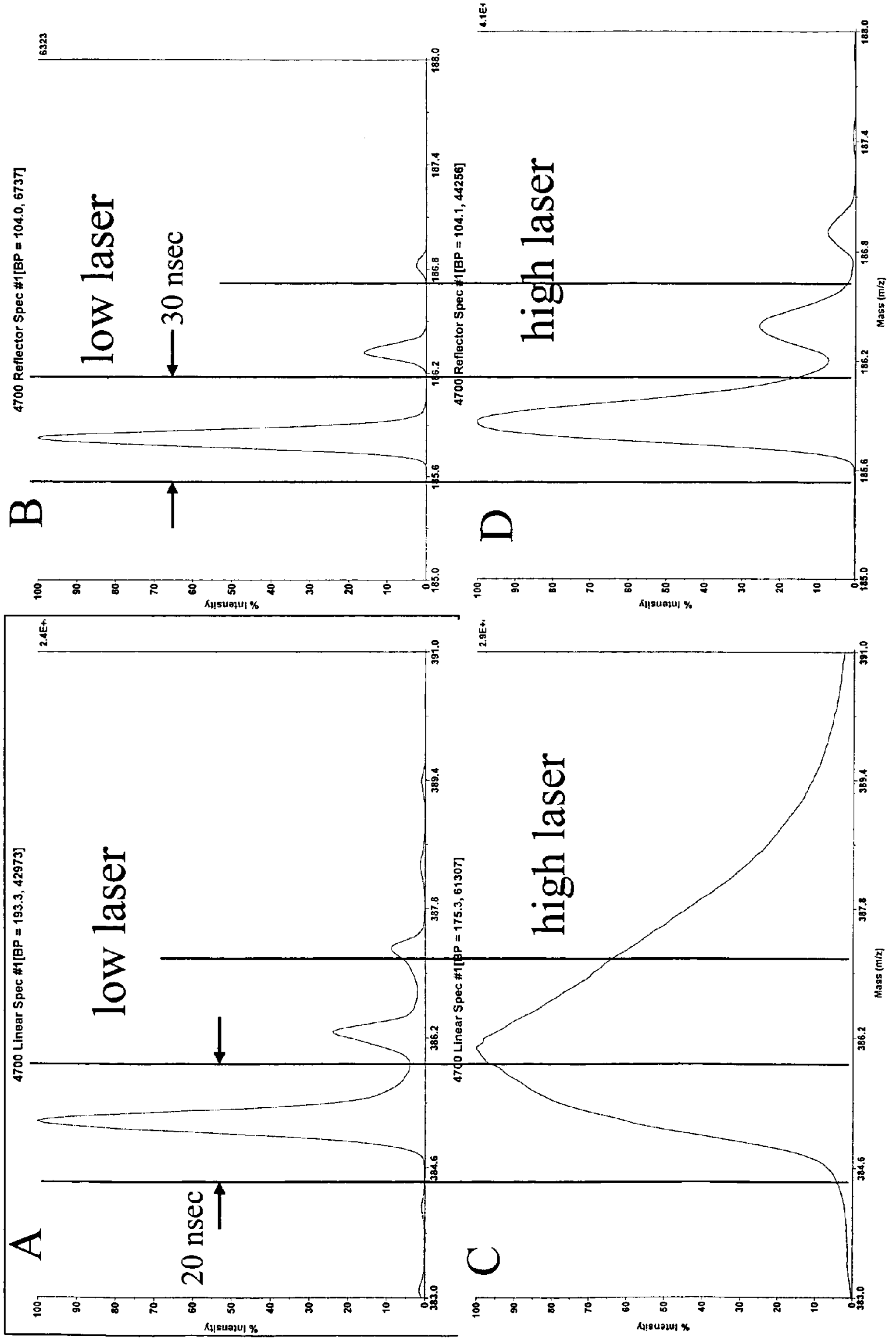
Figure 14:
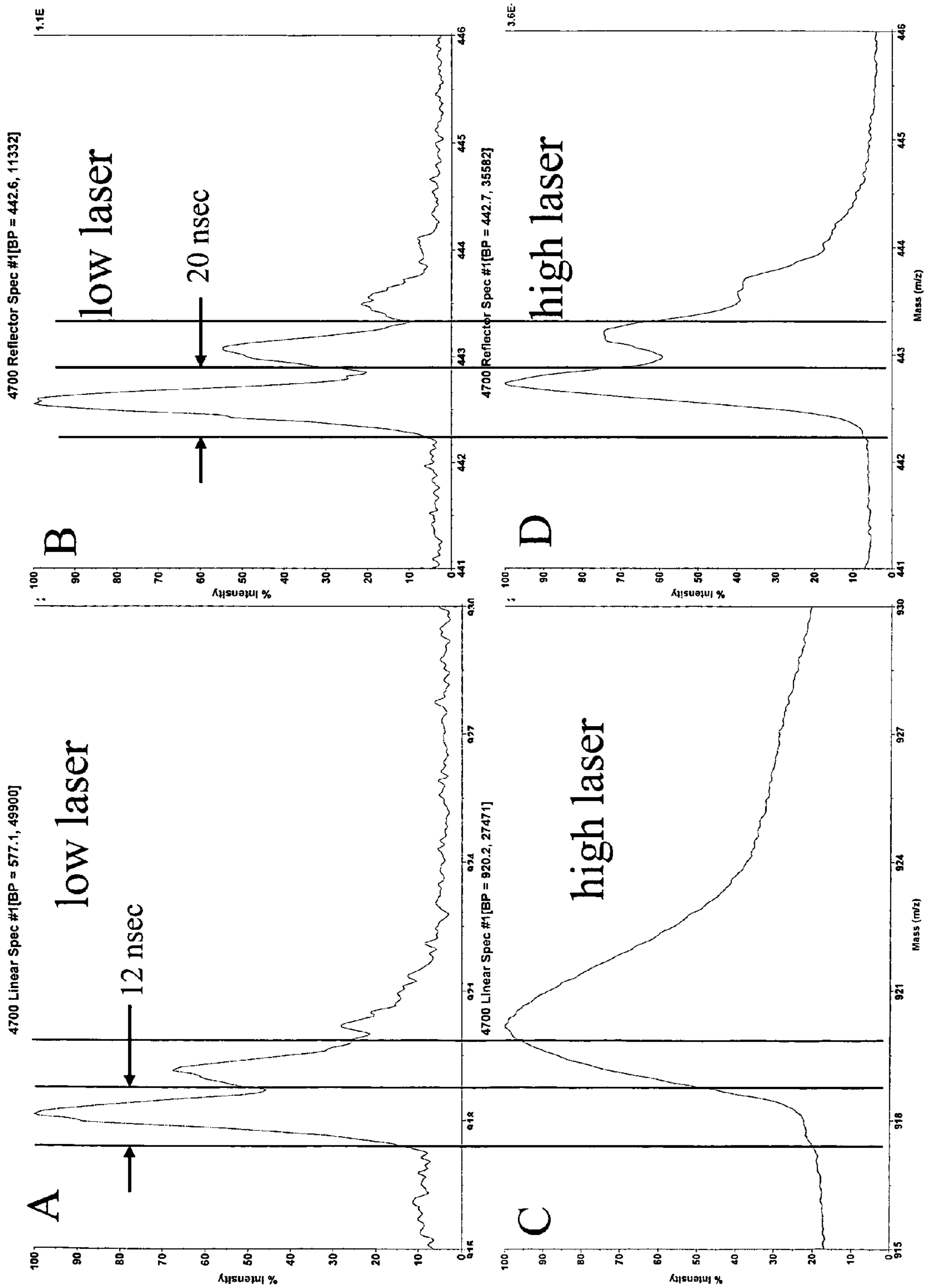
Figure 15:
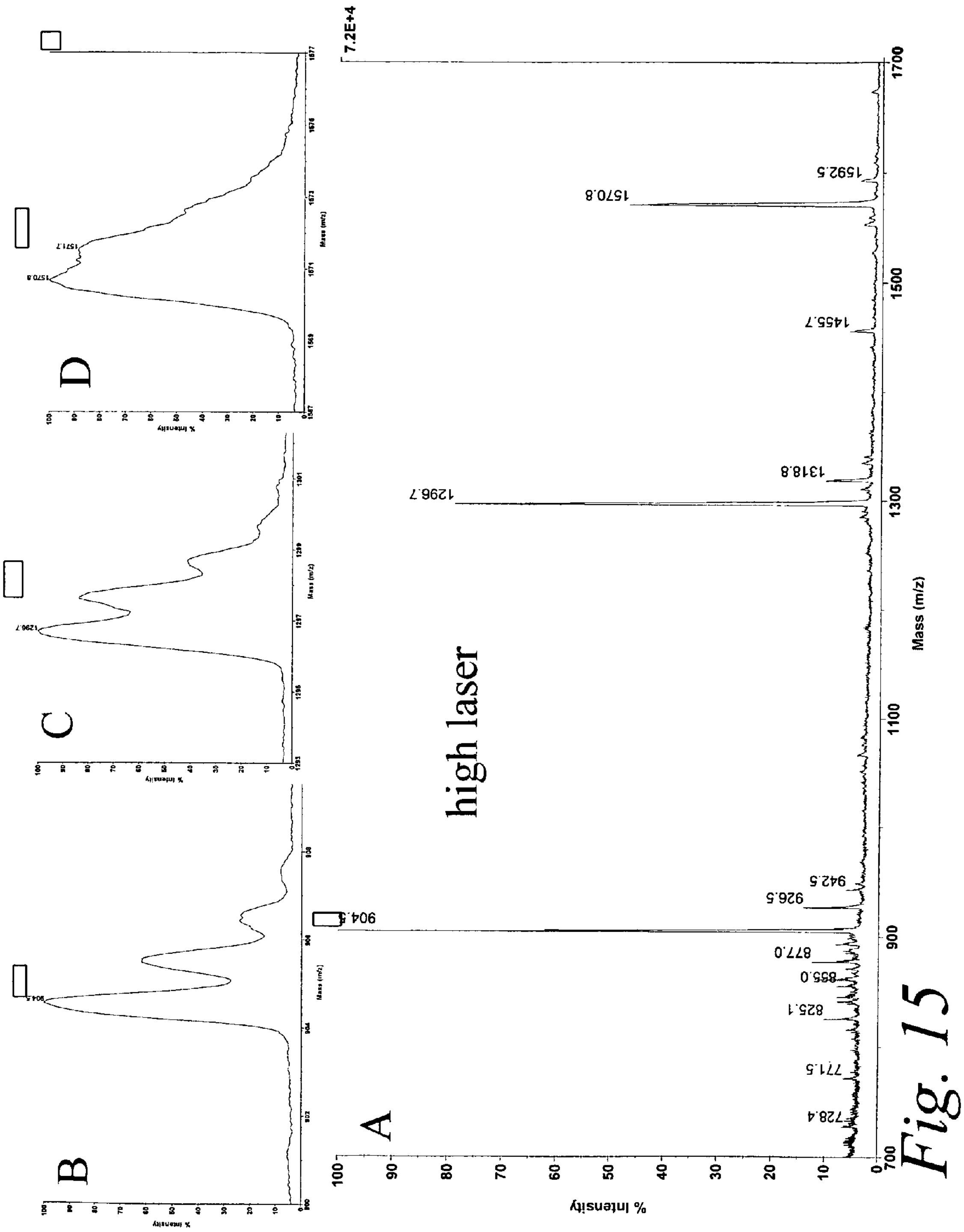
Figure 16:
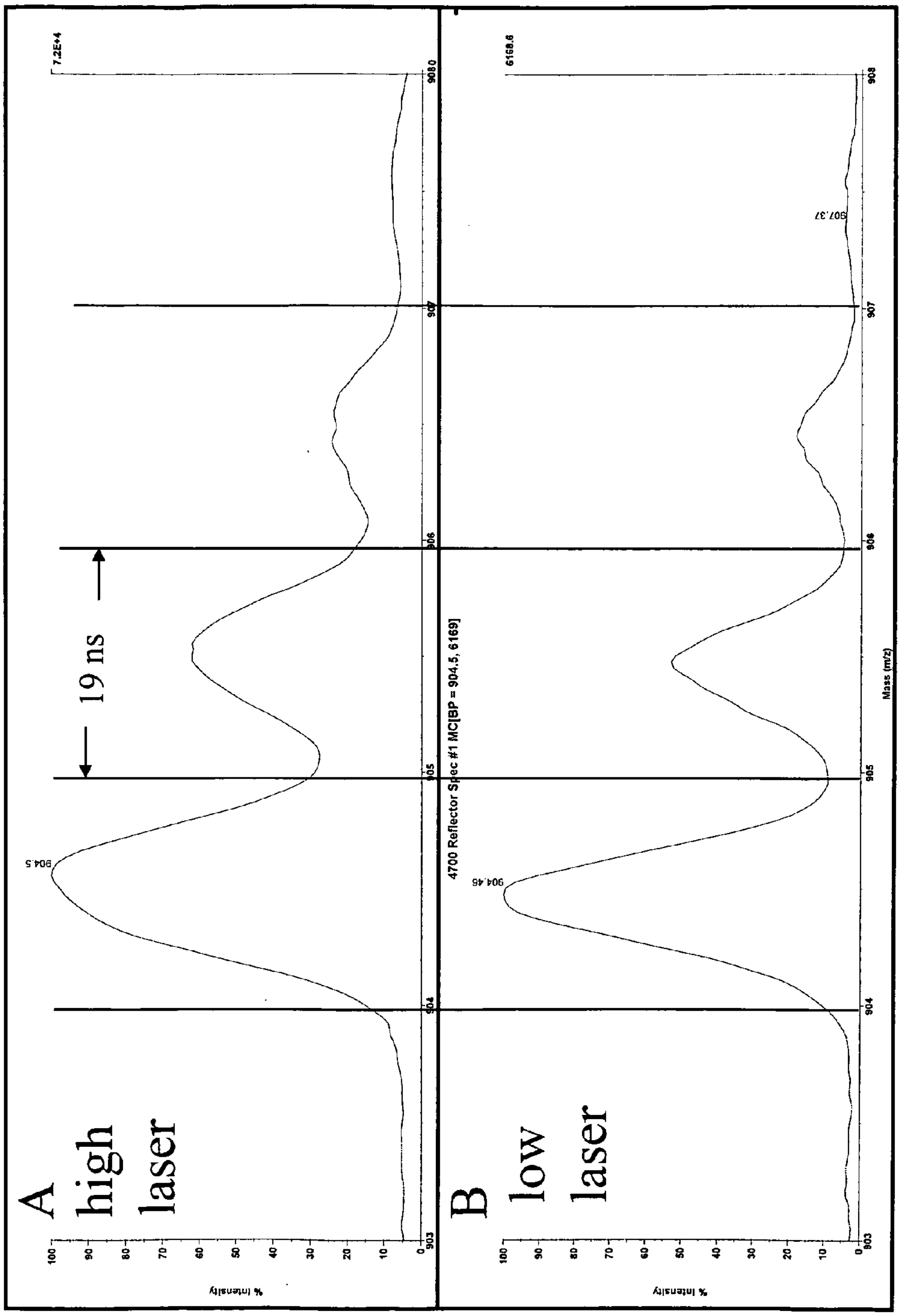

The vertical lines in FIGS. 13, 14, and 16 represent the time windows that can be chosen for a timed-ion-selector placed at the position of the detector in these examples for application to precursor selection in the TOF-TOF instrument. In FIG. 16A, for example, use of a 19 nanosecond window for a timed-ion-selector set to transmit mass 904.46 allows approximately 96% of m/z 904.46 to be transmitted with less than 1% transmission of the adjacent peak at m/z 905.46 at high laser intensity. This may be compared with FIG. 14C, not utilizing the inserted ion optics system 1200, where adjacent peaks cannot be separated with any setting of the timed-ion-selector.

Example 2

TOF-TOF Measurements

This example presents experimental data obtained with the above modified 4700 Proteomics Analyzer operated as a TOF-TOF mass analyzer in a "4700 Proteomics Analyzer" utilizing the inserted ion optics system 1200. In TOF-TOF operational mode (or MS/MS mode) ions are selected for the second stage of analysis using the timed ion selector of the 4700 Proteomics Analyzer.

Figure 17:
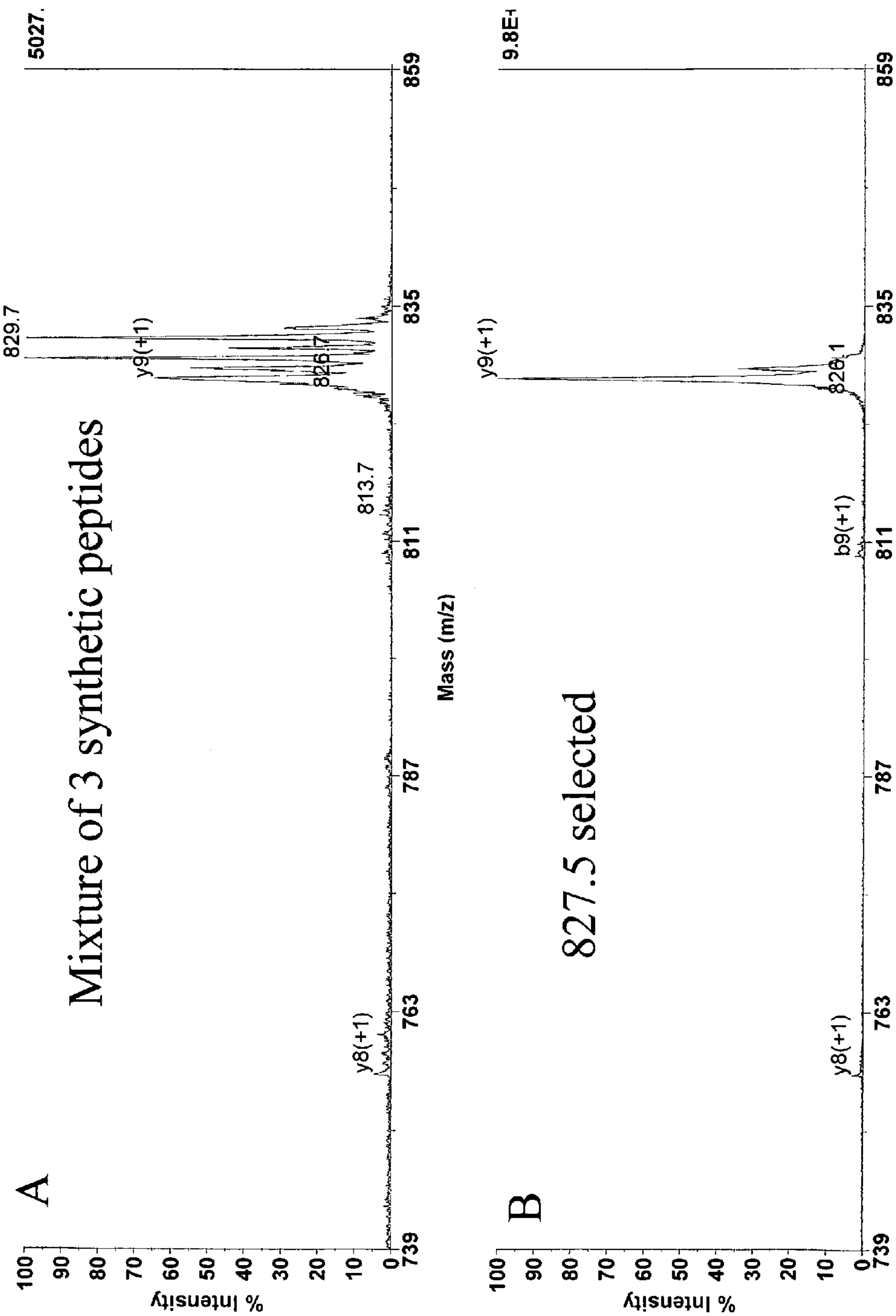

FIGS. 17A and 17B depict a molecular ion region of MALDI-TOF mass spectra for a mixture of three synthetic peptides: APLAVGATK (m/z 827.5; Sequence ID No. 1); AVLAVGATK (m/z 829.5; Sequence ID No. 2); and ATLAVGATK (m/z 831.5; Sequence ID No. 3). In FIG. 17A the timed-ion-selector is set to transmit a relatively broad m/z range so that the precursor ions for all three peptides are transmitted and in FIG. 17B the timed-ion selector is set to transmit the m/z value 827.5.

Figure 18:
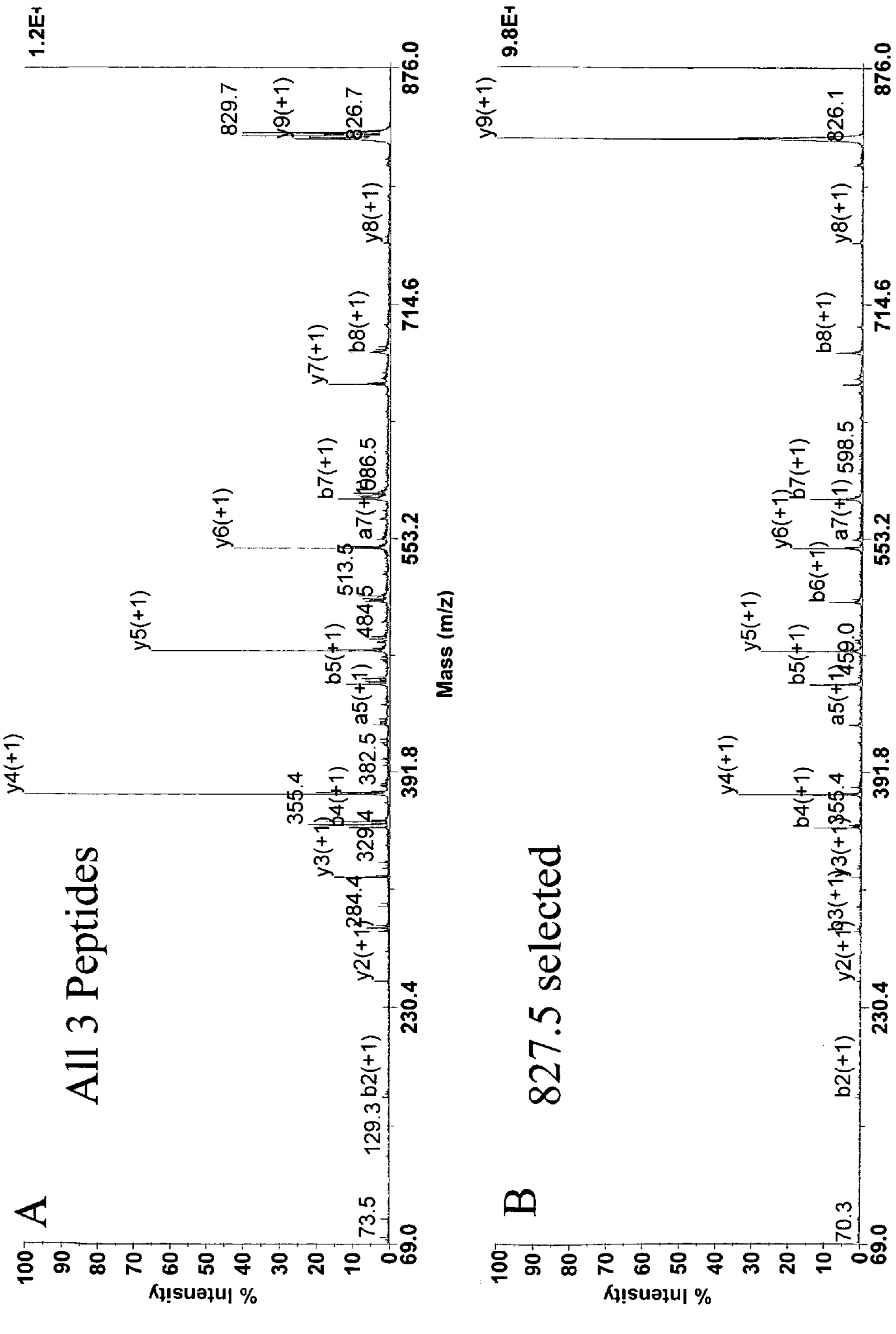

FIGS. 18A and 18B depict the complete spectra, including the fragment ions, for the spectra depicted in FIGS. 17A and 17B, respectively.

Figure 19:
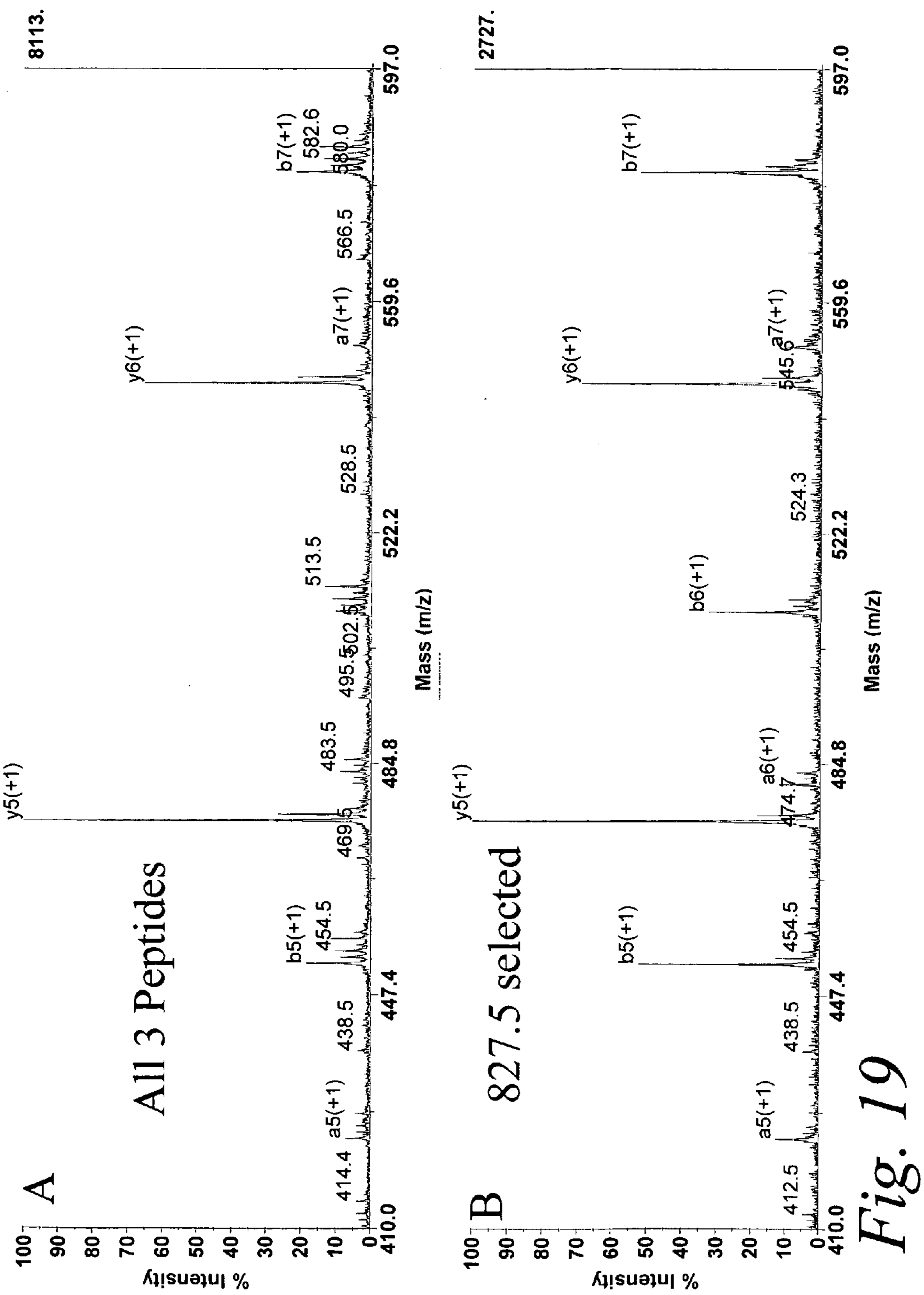
Figure 20:
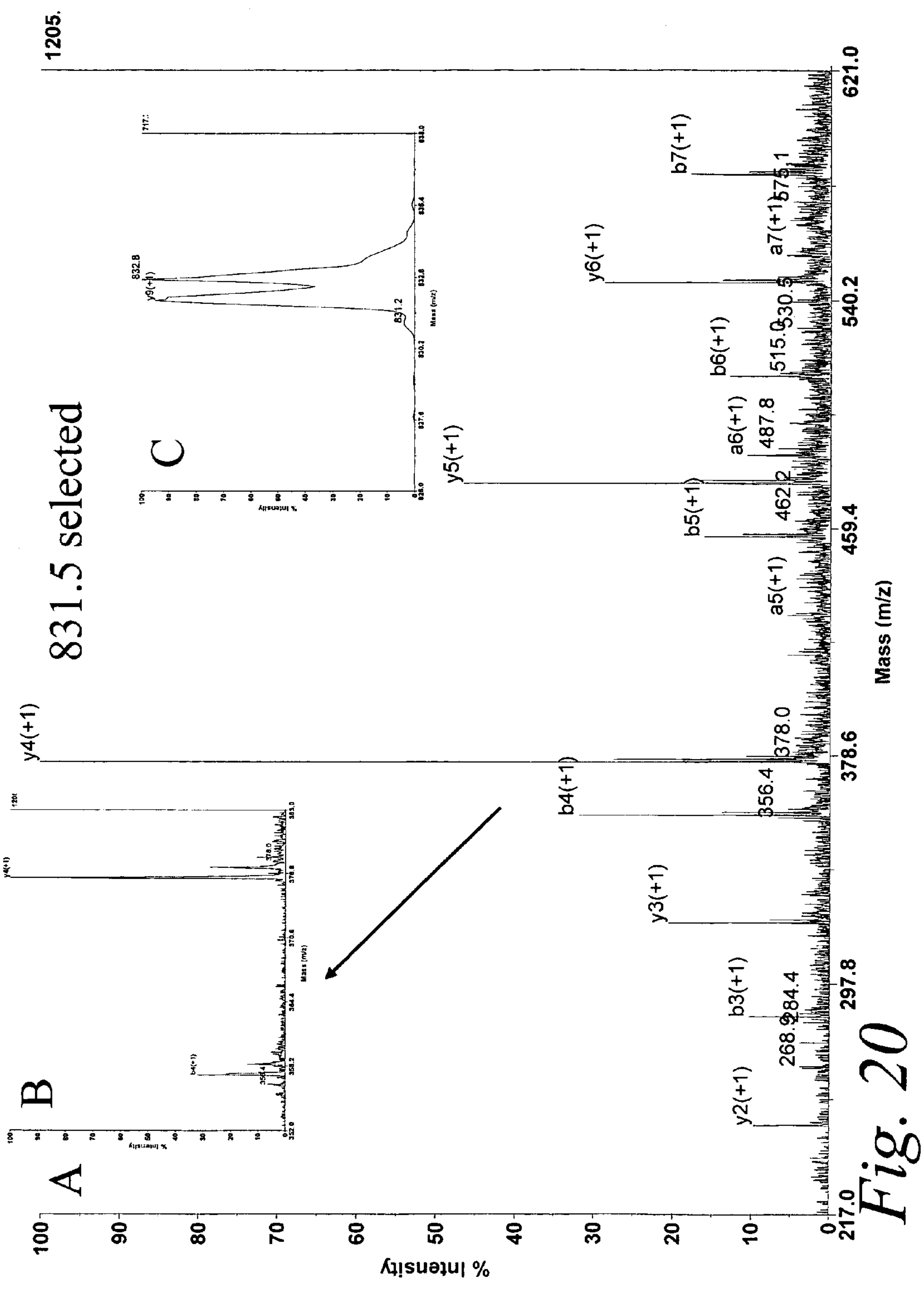

FIGS. 19A and 19B depict expanded portions of FIGS. 18A and 18B, respectively.

The fragment ions in FIGS. 17A-21 are labeled according to the convention known in the art in which fragments formed from cleavage of peptide bonds with the charge on the C-terminus are labeled as y ions, and those with the charge on the N-terminus are labeled as b ions. In both cases the number represents the number of amino acid residues in the fragment, and the number in parenthesis is the charge state. For the peptides present in this test mixture, the y ions smaller than y8 are common to all three peptides, and the b ions larger than b2 differ by about 2 mass units corresponding to the mass differences of proline (P), valine (V), and threonine (T), respectively. In FIGS. 17A-20C, the fragments of mass 827.5 with P in the second position from the N-terminus are labeled. In FIGS. 18B and 19B, corresponding to selection of mass 827.5, substantially all of the fragment peaks detected correspond to fragments of mass 827.5 and are so labeled. By contrast, in FIGS. 18A and 19A, corresponding to lower resolution selection of all three components, the b ions from mass 827.5 are accompanied by the higher mass b fragments from the other 2 components.

FIGS. 20A-20C depict a MALDI-TOF mass spectra obtained for the same mixture of three peptides of FIG. 15A, with m/z 831.5 selected by the timed-ion-selector. In FIGS. 20A-20C, the labeled b fragments correspond to those including the amino acid threonine (T), and the lower mass b fragments from the other peptides in the mixture are not detected.

Figure 21:
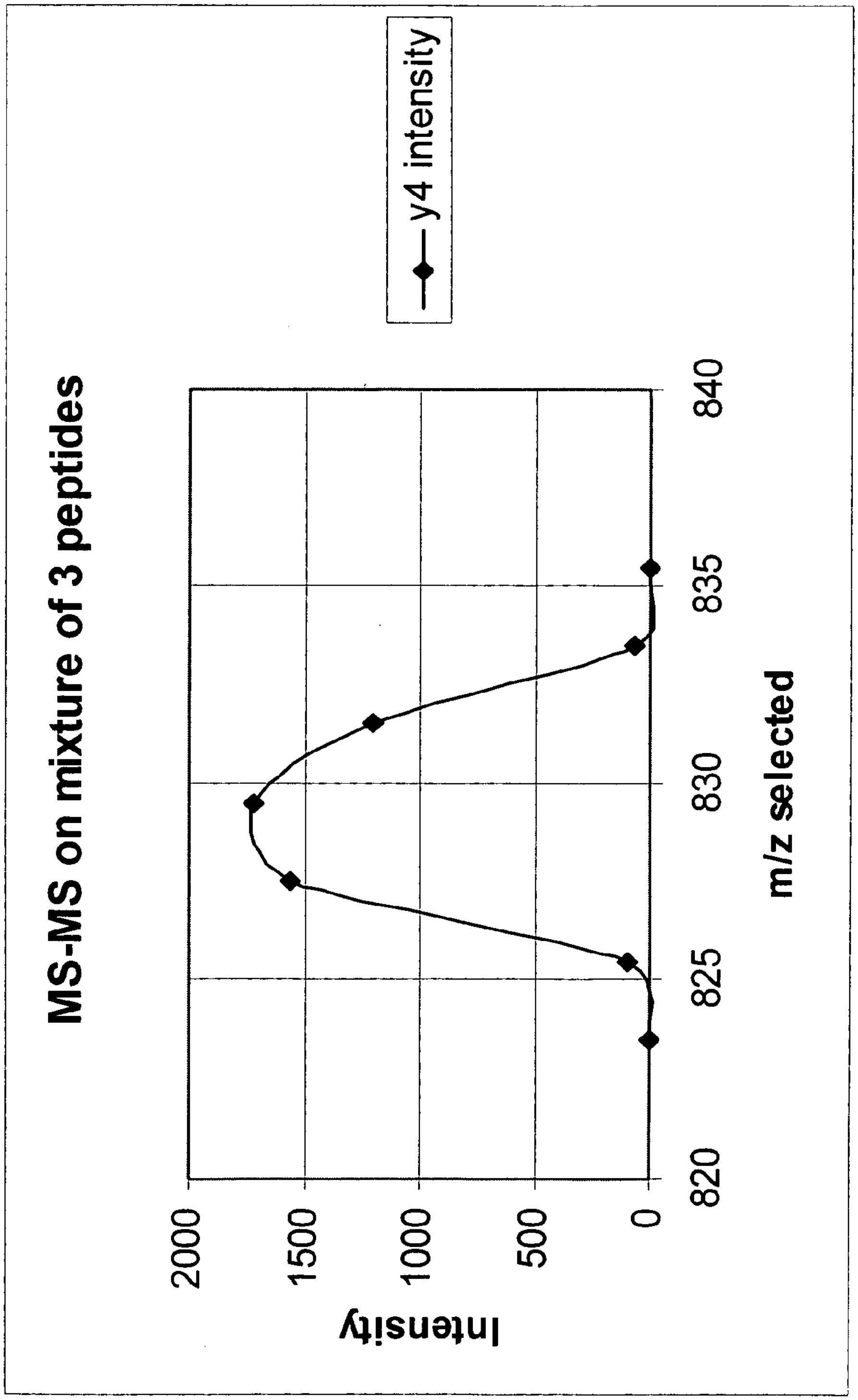
FIG. 21 depicts the transmission of a fragment common to all three peptides of Example 2 as a function of the precursor mass selected.

FIG. 21 depicts the intensity of a fragment ion, y4, common to all three peptides as a function of the m/z value selected by the timed-ion-selector. These results show that the resolution for fragment ions is essentially the same as the resolution for the corresponding precursor ions.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used herein are for organizational purposes only and are not to be construed as limiting the subject matter described in any way.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

The claims should not be read as limited to the described order or elements unless stated to that effect. It should be understood that various changes in form and detail may be made without departing from the scope of the appended claims. By way of example, any of the disclosed features can be combined with any of the other disclosed features to provide an ion optics system or mass analyzer system in accordance with the present teachings. For example, any of the various disclosed embodiments of an ion optics system can be combined with one or more of an ion source, ion selector, ion fragmentor, and ion detector, ion guide, ion-focusing element, ion-steering element, another ion optics system and one or more mass analyzers (e.g. one or more of a time-of-flight, ion trap, quadrupole, RF multipole, magnetic sector, electrostatic sector, and ion mobility spectrometer), to provide a mass analyzer an mass analyzer system in accordance with the present teachings. Therefore, all embodiments that come within the scope and spirit of the following claims and equivalents thereto are claimed.

What is claimed:

1. An ion optics system comprising:

a first ion mirror;

a second ion mirror, the first ion mirror and the second ion mirror disposed on opposite sides of a first plane such that the first ion mirror has a position that is substantially mirror-symmetric about the first plane relative to the position of the second ion mirror;

a third ion mirror; and a fourth ion mirror, the third ion mirror and the fourth ion mirror disposed on opposite sides of the first plane such that the third ion mirror has a position that is substantially mirror-symmetric about the first plane relative to the position of the fourth ion mirror;

wherein the first ion mirror, the second ion mirror, the third ion mirror and the fourth ion mirror are arranged such that a trajectory of an ion exiting the ion optics system can be provided that intersects a surface substantially parallel to a focal surface of the ion optics system at a position that is substantially independent of ion kinetic energy.

2. The ion optics system of claim 1, wherein the first ion mirror, the second ion mirror, the third ion mirror and the fourth ion mirror are arranged such that a trajectory of ions exiting the ion optics system is substantially parallel to a trajectory of said ions entering the ion optics system.

3. The ion optics system of claim 2, wherein the trajectory of ions exiting the ion optics system is substantially coincident with the trajectory of said ions entering the ion optics system.

4. The ion optics system of claim 1, further comprising an ion selector disposed between two of the ion mirrors of the ion optics system.

5. An ion optics system comprising:

two or more pairs of ion mirrors, each pair of ion mirrors comprising a first member and a second member;

the members of each pair of ion mirrors disposed on opposite sides of a first plane such that the first member of a pair of ion mirrors has a position that is substantially mirror-symmetric about the first plane relative to the position of the second member of the pair, the two or more pairs of ion mirrors arranged such that a trajectory of an ion exiting the ion optics system can be provided that intersects a surface substantially parallel to a focal surface at a position that is substantially independent of the kinetic energy of the ion on entering the ion optics system.

6. The ion optics system of claim 5, wherein the two or more pairs of ion mirrors are arranged such that a trajectory of ions exiting the ion optics system is substantially parallel to a trajectory of said ions entering the ion optics system.

7. The ion optics system of claim 6, wherein the trajectory of ions exiting the ion optics system is substantially coincident with the trajectory of said ions entering the ion optics system.

8. The ion optics system of claim 5, further comprising an ion selector disposed between two of the ion mirrors of the ion optics system.

* * * * *